(12) United States Patent
Ramamurthy et al.

(10) Patent No.: US 10,947,899 B2
(45) Date of Patent: Mar. 16, 2021

(54) ENERGY STORAGE AND MANAGEMENT USING PUMPING

(71) Applicant: Energy Harbors Corporation, Inc., Saratoga, CA (US)

(72) Inventors: Shankar Ramamurthy, Saratoga, CA (US); Sudhir Ramtirth Joshi, Emerald Hills, CA (US)

(73) Assignee: Energy Internet Corporation, Saratoga, CA (US)

( * ) Notice: Subject to any disclaimer, the term of this patent is extended or adjusted under 35 U.S.C. 154(b) by 0 days.

(21) Appl. No.: 16/378,243

(22) Filed: Apr. 8, 2019

(65) Prior Publication Data

US 2019/0234305 A1    Aug. 1, 2019

Related U.S. Application Data

(63) Continuation-in-part of application No. 16/118,886, filed on Aug. 31, 2018.

(60) Provisional application No. 62/654,718, filed on Apr. 9, 2018, provisional application No. 62/654,859, filed on Apr. 9, 2018, provisional application No. 62/679,051, filed on Jun. 1, 2018, provisional application No. 62/795,140, filed on Jan. 22, 2019, provisional application No. 62/784,582, filed on Dec.
(Continued)

(51) Int. Cl.
*F02C 6/16* (2006.01)
*G06Q 50/06* (2012.01)
*G06Q 10/06* (2012.01)

(52) U.S. Cl.
CPC ......... *F02C 6/16* (2013.01); *G06Q 10/06314* (2013.01); *G06Q 50/06* (2013.01)

(58) Field of Classification Search
CPC .... F02C 6/16; G06Q 50/06; G06Q 10/06314; G06Q 10/06312; H02J 2203/20; H02J 3/28; H02J 15/003; H02J 15/006; H02J 15/00
See application file for complete search history.

(56) References Cited

U.S. PATENT DOCUMENTS 9,540,957 B2    1/2017  Shinnar et al.
9,562,183 B2    2/2017  Hidalgo et al.
(Continued)

FOREIGN PATENT DOCUMENTS

WO    WO2015123784 A1    8/2015

*Primary Examiner* — Ziaul Karim
(74) *Attorney, Agent, or Firm* — Adams Intellex, PLC

(57) ABSTRACT

Disclosed techniques include energy storage and management using pumping. An energy source is connected to a pump-turbine energy management system, wherein the pump-turbine energy management system includes a pump-energy storage subsystem. Energy from the energy source is stored in the pump-energy storage subsystem. One or more processors are used to calculate a valve-based flow control setting for recovering energy from the pump-energy storage subsystem. One or more valves in the pump-energy management system are energized, wherein the energizing enables energy recovery. Energy is recovered from the pump-energy storage subsystem using a pump-turbine recovery subsystem enabled by the one or more valves that were energized. Waste heat is recovered through a waste-heat recovery subsystem which includes water heat exchangers or a fluid spray. The water from the water heat exchangers can be used to make steam or ice.

27 Claims, 17 Drawing Sheets

Related U.S. Application Data 24, 2018, provisional application No. 62/795,133, filed on Jan. 22, 2019, provisional application No. 62/552,747, filed on Aug. 31, 2017, provisional application No. 62/654,718, filed on Apr. 9, 2018, provisional application No. 62/654,859, filed on Apr. 9, 2018, provisional application No. 62/679,051, filed on Jun. 1, 2018.

(56) References Cited

U.S. PATENT DOCUMENTS

| | | |
|---|---|---|
| 9,568,235 B2 | 2/2017 | Dobbs |
| 9,631,846 B2 | 4/2017 | Chen et al. |
| 9,651,030 B2 | 5/2017 | Kim et al. |
| 9,664,140 B2 | 5/2017 | Kalika |
| 2008/0046387 A1 | 2/2008 | Gopal et al. |
| 2008/0071705 A1* | 3/2008 | Enis ............... G06Q 10/00 705/412 |
| 2008/0172279 A1 | 7/2008 | Enis et al. |
| 2009/0301089 A1* | 12/2009 | Bollinger ......... F15B 11/0725 60/652 |
| 2010/0308765 A1* | 12/2010 | Moore ................. H02J 3/14 320/103 |
| 2013/0336721 A1* | 12/2013 | McBride ............ E21D 11/00 405/55 |
| 2014/0039710 A1 | 2/2014 | Carter et al. |
| 2014/0129042 A1 | 5/2014 | Miner |
| 2014/0261288 A1* | 9/2014 | Coney ................. F02G 3/00 123/197.1 |
| 2015/0033724 A1 | 2/2015 | Fong et al. |
| 2017/0005515 A1 | 1/2017 | Sanders |
| 2017/0038157 A1 | 2/2017 | O'Donnell et al. |
| 2017/0044414 A1 | 2/2017 | Sutterlin et al. |
| 2017/0067667 A1 | 3/2017 | Choi |
| 2017/0082060 A1 | 3/2017 | Kalika |
| 2017/0082380 A1 | 3/2017 | Gauche et al. |
| 2017/0159495 A1 | 6/2017 | Laughlin et al. |
| 2018/0156143 A1* | 6/2018 | Hussain ............ F02D 41/0055 |

* cited by examiner

ENERGY STORAGE AND MANAGEMENT USING PUMPING

RELATED APPLICATIONS

This application claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

This application is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to energy management and more particularly to energy storage and management using pumping.

BACKGROUND

Government agencies, energy producers, and responsible energy consumers enforce, initiate, and practice energy conservation measures, respectively. Conservation techniques can be simple and effective habits such as turning off unneeded lights when leaving a room, or adjusting the thermostat lower in winter and higher in summer. Purchasing energy-efficient appliances or vehicles is another common approach. Despite these conservation efforts, energy demands of all types continue to increase and often exceed energy supply. Growth of towns, cities, states, and countries increases the demand for energy of all kinds, resulting in what is now considered an energy crisis by many analysts. There are many root causes for the energy demand increases. Overconsumption of energy imposes strains on natural resources ranging from fossil fuels to renewables or biofuels such as wood chips, resulting increased environmental pollution and fuel shortages. Population growth, and providing electricity to previously underserved or unserved regions, put further strains on energy sources. Population growth increases the numbers of energy consumers who want to perform daily tasks such as washing, cooking, entertaining, illuminating, and heating and cooling of their houses and apartments. Beyond the domestic use, increases in energy demand result from public projects and expanded economic activities such as manufacturing, transportation, and retail, among many.

Energy distribution problems are a primary hindrance to solving the energy crisis. Inadequate energy distribution infrastructure, and aging energy generation sources and equipment, cannot keep pace with the new and emerging energy demands. Renewable energy options remain largely unexplored or underdeveloped. Landowners and others who live adjacent to proposed energy generation sites often wage vehement resistance to the construction of windmills, solar farms, or wood burning plants. Further, when plans can be made to construct new energy producing facilities, distribution of the energy is stymied by the poor distribution infrastructure. Commissioning of new energy generation facilities remains a nearly intractable goal. Legal wrangling, construction delays, pollution mitigation requirements, overwhelming costs, or war, have prevented, halted, or delayed bringing new energy generation facilities online. Energy wastage is another major culprit. Aging appliances or manufacturing equipment, incandescent light bulbs, and poor building insulation and air sealing, all waste energy in comparison to their modern counterparts.

To meet the increases in energy demands of all types, public officials and city planners have been confronted with choosing among three broad design or policy choices: to increase energy production through building new power plants, to reduce energy demand through energy conservation measures, or to combine both of these methods. An increasingly popular energy production option is to source energy based on renewable energy production such as solar, wind, geothermal, wave action, tidal, and so on. Perhaps the primary limitation to sole reliance on renewable energy sources is the sporadic nature of these energy sources. For example, solar sources produce energy only in the presence of light. Further, the amounts of energy produced vary depending on the intensity of the light hitting the photovoltaic panels. Energy sources and energy demands must be balanced so that clean and reliable energy is consistently available to all consumers countrywide.

SUMMARY

Energy production is based on effective energy management. Energy generation that is effectively managed produces energy in sufficient amounts to at least meet the energy demands at a given time. The demands for the energy include small consumers such as households or small farms, and large consumers such as manufacturers and producers, hospitals and schools, and others. Energy is further consumed for transportation, lighting, heating and cooling, etc. Energy produced in excess of the immediate energy demands can be stored. The storing of the excess energy includes short-term storage to meet energy demand peaks or short energy source disruptions, or long-term storage. The long-term storage of energy is of particular interest to both energy producers and consumers. The long-term storage can capture and store for later use excess energy produced using conventional techniques. Long-term storage also can capture and store energy produced by less reliable or intermittent energy sources including renewable energy sources such as solar, wind, or tidal sources. The storage at the time of production of the excess or renewable energy enables access to energy at a later time when the renewable energy source is not producing. Long-term energy storage also has cost advantages. Storing energy when the production costs of the energy are low, then subsequently accessing the stored energy when production costs of energy are high, can even out production costs, reduce overall energy production costs, etc.

Energy production and energy consumption differences can increase or decrease over a given period of time. These differences can further depend on a timeframe such as day versus night, day of the week, manufacturing schedules, seasonal factors such as heating or cooling, and so on. The energy production-consumption difference indeed can be significant and at times critical. The differences often correlate to time-dependent energy demands, changeable energy production capabilities such as the presence or absence of a renewable resource used to generate the energy, available capacity of commercial or grid power, the amount of standby or backup energy, and so on. To stabilize the energy production/consumption imbalance, energy excess to demand at a given time can be stored and used at another time. The stored energy can be sourced when demand exceeds a given power level. Energy can be collected and stored when a renewable resource is available, when energy available is in excess of power needed, or even when the cost of production of the power is relatively inexpensive. The stored energy can be used to augment available energy or instead to provide the amount of energy that is needed during periods of increased or unmet energy need. The recovery of stored energy can be applied to low-level energy demand scenarios, such as the energy needs of a house or small operation such as a farm, to larger scale energy needs such as manufacturing, or to the largest energy needs of an energy distribution grid.

Disclosed techniques address energy storage and management using pumping. An energy source is connected to a pump-turbine energy management system, where the pump-turbine energy management system includes a pump-energy storage subsystem. The energy source can include grid energy, renewable energy, locally generated energy, etc. Energy from the energy source is stored in the pump-energy storage subsystem. The pump-energy storage subsystem can include pump-turbines, high-pressure water containers, compression-expansion chambers, steam containment vessels, heat exchangers, compressed air chambers, and so on. One or more processors are used to calculate a valve-based flow control setting for recovering energy from the pump-energy storage subsystem. The valves can include electrically operated valves, fluid-operated valves, and the like. Energy is recovered from the pump-energy storage subsystem using a pump-turbine recovery subsystem enabled by the one or more valves that were energized. Energy recover can be based on using a fluid or gas to spin a turbine. Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
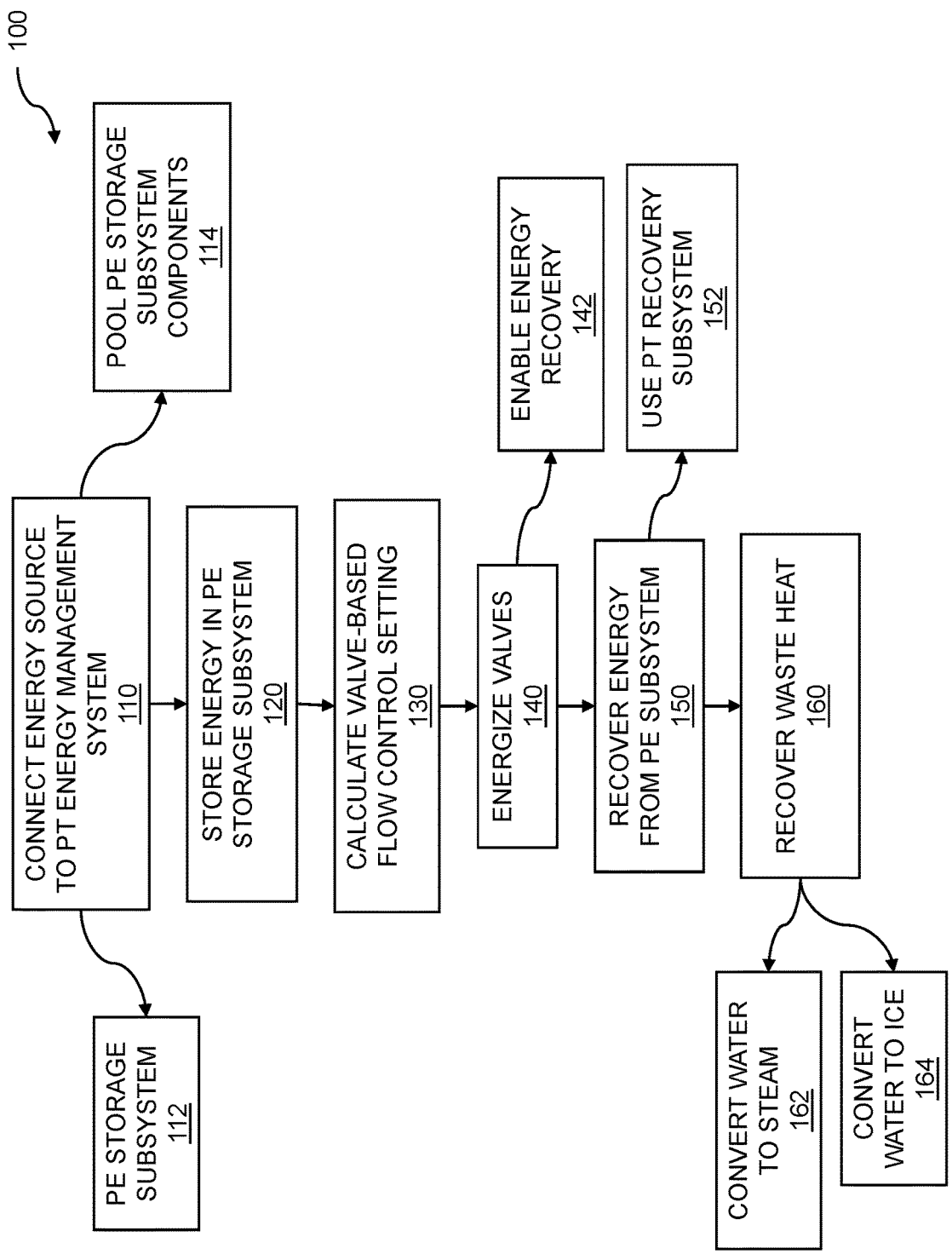
FIG. 1 is a flow diagram for energy storage and management using pumping.

This disclosure provides techniques for energy storage and management using pumping. The energy storage and management is based on a pump-turbine management system, where the pump-turbine management system includes subsystems such as a pump-energy storage subsystem. The pump-turbine energy management system can be used to provide energy when a higher level of energy is needed. The pump-turbine energy management system can store energy when the amount of energy available exceeds the energy demand. The energy can be stored for a period of time. The pump-turbine subsystems include multiple pressurized storage elements such as compressed air storage elements. Managing the sourcing, storing, and extracting of energy is a complex and highly challenging task. Energy management can be influenced by many factors including the weather, fluctuating energy demand, variable pricing schemes, and so on. Energy management can be further complicated by quickly changing customer energy demands, requirements of service level agreements (SLAs), etc. Despite the growing use of renewable energy resources such as solar, wind, wave action, tidal, geothermal, and the like, two significant challenges remain: the amount of energy produced by a given renewable energy source is highly variable, and the availability of the renewable energy source is inconsistent. As an example, wind energy is only available when wind is present, solar energy only when the sun is shining, wave action energy only when there is wave action, and so on.

Energy with intermittent availability can be stored or cached when the energy is being produced, then later extracted when the stored energy is needed. A similar strategy can be used based on price, where energy is stored when production cost is low, then later extracted when the energy production cost is high. The stored energy can be used in combination with other energy sources such as grid power to meet energy demands at given times. Storage can include a period of time, where the period of time can be a short-term basis or a long-term basis. Here, a short-term basis can include an integer number of seconds, minutes, hours, or days, where the integer number of seconds, minutes, hours, or days comprises a length of time substantially less than one week. A long-term basis can include an integer number of weeks, months, seasons, or years, where the integer number of weeks, months, seasons, or years comprises a length of time substantially more than one day. Energy losses are introduced when converting energy from one energy type to another energy type. Further losses occur when storing energy, extracting energy, routing energy, etc. Minimizing the energy losses is critical to any energy storage and retrieval/recovery technique. Electrical energy storage has been possible using techniques such as mature storage battery technologies, but the costs of large battery banks are prohibitive in terms of up-front cost and maintenance costs. Further, batteries are problematic for long-term storage purposes because of charge leakage. Usage of batteries on a large scale, especially for multi-month storage for example, is simply not a viable solution.

In disclosed techniques, energy storage and management use pumping. The pumping can be used to pressurize and store a gas or a liquid. The pressurized gas or liquid can then be used later to recover the stored energy. An energy source is connected to a pump-turbine energy management system, where the pump-turbine energy management system includes a pump-energy storage subsystem. The pump-energy storage subsystem can include pump-turbines, high-pressure water containers, compression-expansion chambers, steam containment vessels, heat exchangers, compressed air chambers, and so on. Energy from the energy source is stored in the pump-energy storage subsystem. The energy from the energy source can be stored as high-pressure water, compressed air, steam, ice-slush, etc. One or more processors are used to calculate a valve-based flow control setting for recovering energy from the pump-energy storage subsystem. The valve-based flow control settings can be used to control the flow of liquid or gas in the pump-energy storage subsystem. One or more valves in the pump-energy management system can be energized, where the energizing enables energy recovery. The valves within the one or more valves can be opened, closed, adjusted for rate of flow, and so on. Energy from the pump-energy storage subsystem is recovered using a pump-turbine recovery subsystem enabled by the one or more valves that were energized. The pump-turbine can be spun using pressurized water, pressurized air, steam, etc., to generate electrical energy. The compression and expansion of air can be achieved by a plurality of vessels, pumps, valves, and other auxiliary equipment, called components. These components will be arranged or connected according to a loose coupling concept such that the software operating system can bypass any non-functioning component and reroute the process using another similar component. This will allow the non-functioning component to be serviced and put back into operation. This modularization architecture increases resilience of the operation, improves predictive maintenance scheduling, and improves productivity and on-stream of the entire system. This also allows the system to connect heterogeneous components based on different operating principles that perform similar functions to carry out the process and manage mismatch of capacity within the operating realm.

The disclosed concept/concepts relate to energy storage in the form of air compressed by pumped water. The recovery of heat derived from air compression can generate electricity and maintain isothermal operation, and the adding of heat into expanding air as the latent heat of freezing of water can generate a cooling ice slush and maintain isothermal operation. This concept addresses two key shortcomings of compressed air energy storage (CAES) namely, (1) recovering heat of compression which is lost in most instances, and (2) adding heat to the expanding air so as to recover additional energy from compressed air which otherwise would be too cold to maximize energy extraction. This concept achieves these two improvements by eliminating the compressor for compressing air and replacing it with a plurality of pumps and pressure vessels where pumped water under pressure pressurizes the air. The hot pressurized air is used to heat a suitable working fluid (with water being the working fluid of choice) to generate vapor (steam if the working fluid is water) to drive a conventional turbine generator to generate electricity. This electricity can be used to compress more air, can be fed into the grid, or can be stored in batteries or other energy storage devices. The air which will be cooled to within a few degrees of generated vapor can be further cooled by running another power generating cycle such as Organic Rankine Cycle (ORC). Alternatively, the air can be cooled by conventional means to a temperature appropriate for its storage under pressure, whether that storage be underground, under water, or in pressure vessels.

When there is need to access this compressed air to generate electricity, the compressed air will be used to push water under pressure through a turbine or other conventional power generating equipment to generate electricity. As the air expands, it will cool following thermodynamic principles. Depending on starting pressure and final pressure, the expanded air can cool to −150° C. or −200° C. or more. Such extreme cooling reduces the volume of air and reduces its energy content. This drives the system to extract maximum energy from the compressed air. In this invention, heat is added to the cooling air by bringing it in intimate contact with water. The water will start to freeze at 0° Celsius. Thus, the freezing of water will warm the air and bring it within a few degrees of freezing point of water, namely near 0° Celsius.

The compression and expansion of air will be achieved by a plurality of vessels, pumps, valves, and other auxiliary equipment, called components. These components will be arranged or connected according to a loose coupling concept such that the software operating system can bypass any non-functioning component and reroute the process using another similar component. This will allow the non-functioning component to be serviced and reinstated. This modularization architecture increases resilience of the operation, improves predictive maintenance scheduling, and improves productivity and on-stream of the entire system FIG. 1 is a flow diagram for energy storage and management using pumping. Energy storage and management can be based on energy storage subsystems such as pump-energy storage subsystems. The storage subsystems can be pooled. The pooling can include adding or removing energy subsystems as needed for energy storage or extraction based on energy demand. The energy subsystems can include multiple pressurized storage elements such as high-pressure water, pressurized air, steam, and the like. An energy source is connected to a pump-turbine energy management system, where the pump-turbine energy management system includes a pump-energy storage subsystem. Energy from the energy source is stored in the pump-energy storage subsystem. One or more processors are used to calculate a valve-based flow control setting for recovering energy from the pump-energy storage subsystem. One or more valves in the pump-energy management system are energized, where the energizing enables energy recovery. Energy from the pump-energy storage subsystem is recovered using a pump-turbine recovery subsystem enabled by the one or more valves that were energized.

A flow 100 is shown for energy storage and management using pumping. Energy can be stored and retrieved or extracted from multiple energy storage subsystems, where the storage subsystems can include a pump-turbine storage subsystem. The pump-turbine storage subsystem can include energy storage elements such as high-pressure chambers, compression-expansion chambers, compressed air chambers, and so on. In embodiments, a pump-turbine energy management system can be implemented within a non-productive oil well infrastructure, unused salt caverns, aquifers, large cavities underground, or porous rock structures capable of holding air or water under pressure. The chambers of the pressurized storage elements can include pressurized capsules, pressurized bladders, pressurized accordion-fold bags, and so on, for storing compressed air, steam, liquids (e.g. water), etc. Other storage modules can include batteries, inductors, capacitors, etc. The storage modules can store various energy types including electrical energy, thermal energy, kinetic energy, mechanical energy, and so on. The flow 100 includes connecting an energy source to a pump-turbine energy management system 110. The energy source can include a commercial energy source such as a grid power source. Other energy generation techniques can be used as energy sources. The energy course can include a renewable energy microgrid. In embodiments, the renewable energy microgrid includes one or more of a solar farm, a wind turbine farm, a tidal energy system, a bio-fuel system, a wave energy system, and so on. The pump-turbine energy management system includes a pump-energy storage subsystem 112. A pump-energy storage subsystem can include one or more of a pump-turbine, a high-pressure water chamber, a compression-expansion chamber, heat exchangers, compressed air chambers, and so on. In embodiments, the pump-turbine energy management system can include pooling 114 of one or more of pump-energy storage subsystem components, pump-turbine recovery subsystem components, or waste-heat recovery subsystem components. The pooling can include redundant components, where the redundant components can support 1N redundancy, 1N+1 redundancy, 2N redundancy, and so on. The redundant components can include spares, replacements, and so on. The redundant components can be hot swappable. A component is hot swappable if it may be added to or subtracted from a system or subsystem without having to take the system or subsystem offline beforehand.

The flow 100 includes storing energy from the energy source in the pump-energy storage subsystem 120. The pump-energy storage subsystem can include a variety of components in which energy of various types can be stored. In embodiments, the pump-energy storage subsystem includes high-pressure water storage. High-pressure water storage can be pressurized using a pump, a pump turbine, a hydraulic head, and so on. The high-pressure water storage can be used to apply pressure to other liquids or to gases. In embodiments, the high-pressure water storage enables compressed air storage. The high-pressure water can be pumped or directed into a chamber that contains water and air which are separated by a diaphragm or other barrier. Recall that pressurizing a gas can cause the temperature of the gas to increase. In embodiments, enablement of the compressed air storage can include a heat exchanger. The heat exchanger can be a water heat exchanger, discussed below. The heat exchanger can be used to collect heat and to control heating or cooling of compressed air storage. In embodiments, air from the compressed air storage can be temperature controlled by latent heat of water from the high-pressure water storage. The temperature control can be used to prevent air from the compressed air storage from becoming too hot or too cold. The compressed air storage can be located on land, under water, etc. In embodiments, the compressed air storage is under a large elevation of sea water. In other embodiments, the compressed air storage is under a large elevation of water such as fresh water, brackish water, and the like. The compressed air can be stored in a "soft" structure such as a bladder. The bladder can include a capsule, an accordion-fold bag, an expandable bag, and so on. The large elevation of water can be greater than 100 meters. In embodiments, the compressed air storage can be maintained by an air bladder pressurized by a water column of the sea water.

The flow 100 includes calculating, using one or more processors, a valve-based flow control setting 130 for recovering energy from the pump-energy storage subsystem. The one or more processors can be located near or within the pump-energy storage subsystem or can be located remotely from the pump-energy storage subsystem. The flow 100 includes energizing one or more valves in the pump-energy management system 140. The one or more valves can be used to control flow of liquid or gas. The one or more valves can be open, closed, or adjusted for flow rate. In embodiments, the energizing valves enables energy recovery 142. The energy recovery can include recovering energy stored as heat, cold, pressure, and so on.

The flow 100 includes recovering energy from the pump-energy storage subsystem 150 using a pump-turbine recovery subsystem 152 enabled by the one or more valves that were energized. With valves turned on, off, or adjusted, energy that was stored as water pressure, gas pressure, and so on, can be directed to the pump-turbine recovery subsystem. The high-pressure water, compressed air, steam, etc., can be used to spin the turbine of the pump-turbine recovery subsystem. The turbine can be used to generate electrical energy, for example. In embodiments, the pump-turbine recovery subsystem includes a water-to-ice transition. The lowered thermal energy of the compressed-air chamber can be captured by converting water to ice. The water-to-ice transition can be enabled by an ice slush tank. In embodiments, the ice slush tank is driven off a heat exchanger in a water-based high compression chamber.

The flow 100 further includes recovering waste heat 160 through a waste-heat recovery subsystem. The waste heat can be collected from a compressed-air chamber while the air in the compressed-air chamber is being compressed or decompressed. Compressing the air generates heat by increasing thermal energy, while decompressing the air "generates" cold by reducing thermal energy. To capture the waste heat, the waste-heat recovery subsystem can include one or more heat exchangers. The heat exchangers can be water heat exchangers, where the water can be pumped through the heat exchanger to transfer heat or cold from the compressed-air chamber. In embodiments, the one or more heat exchangers can enable converting water to steam 162. The steam can be used to spin a turbine for electrical energy generation. In other embodiments, the one or more heat exchangers can enable the converting of water to ice 164. To prevent freeze up of the pump-turbine, the pump-turbine recovery subsystem can include a gas preheater. The preheater can be used to stabilize the temperature of the expanding gas, such as air, so that the pump-turbine does not clog with frost or ice. The preheater can be powered by an external fuel source. In embodiments, the gas preheater is connected to a heat exchanger in a water-based high compression chamber.

Figure 2:
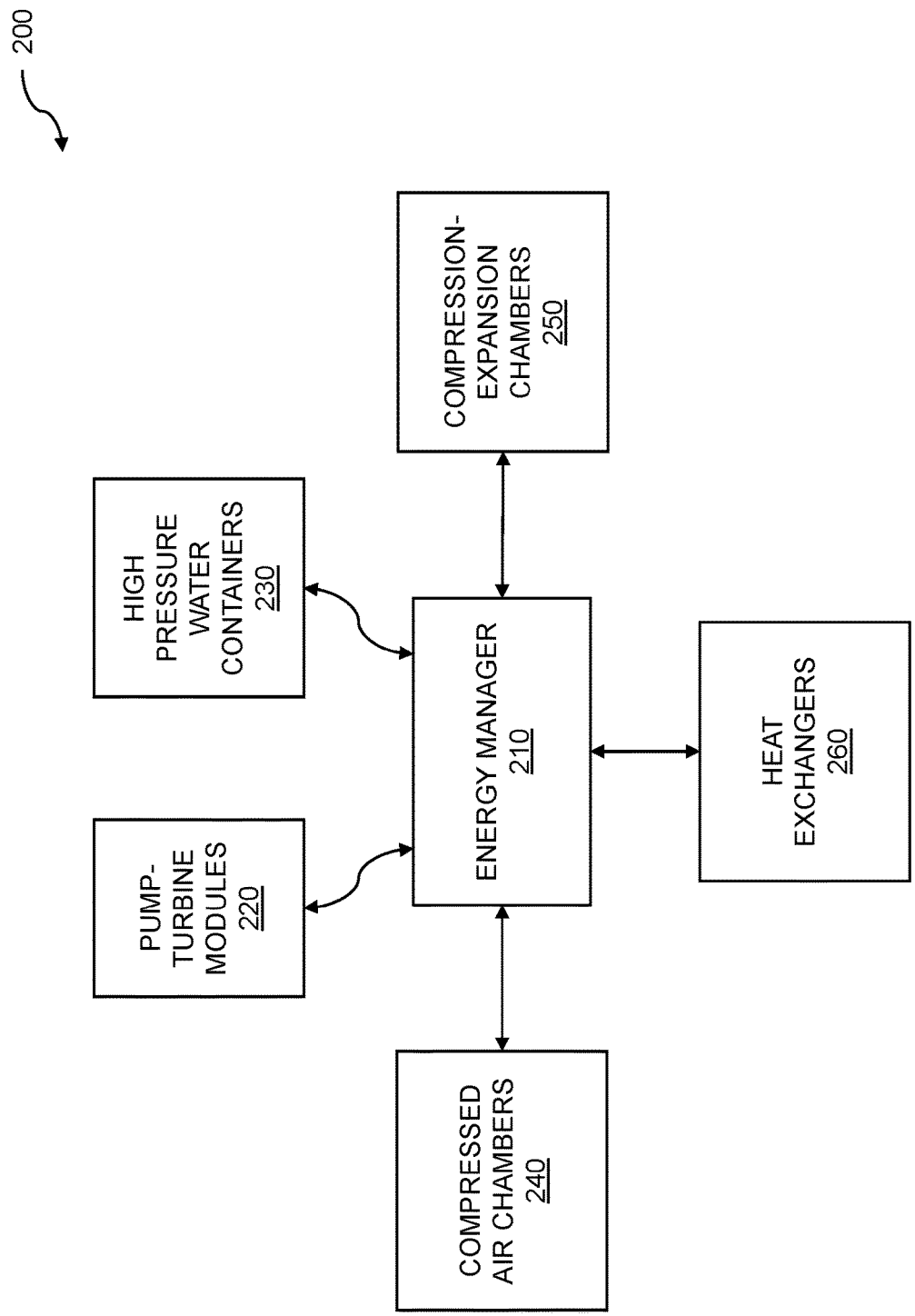
FIG. 2 is a system diagram for managing energy storage components.

FIG. 2 is a system diagram for managing energy storage components. The energy storage components can comprise a pump-turbine energy management system. The pump-turbine energy management system can include a pump-energy storage subsystem. The energy storage components can be used to store energy in various forms such as charge, heat, pressure, and so on. The system 200 includes an energy manager 210. The energy manager can be used to add energy modules, to subtract energy modules, to control the energy modules, etc. The control of the energy modules can be based on system simulation, where the system simulation can enable critical state avoidance. The system 200 can include pump-turbine modules 220. The pump-turbine modules can be used to pump a gas such as air or nitrogen, a liquid such as fresh water or salt water, and so on. The pump-turbine system can utilize high-pressure storage. The system 200 can include a plurality of high-pressure water containers 230. The high-pressure containers can include tanks or capsules which can be located above ground, underground, submerged in liquid, and so on. In embodiments, the plurality of high-pressure containers can be operated at substantially the same high-pressure point. The high-pressure containers operated at substantially the same high-pressure point can be operated in parallel. In other embodiments, the plurality of high-pressure containers is operated at substantially different high-pressure points. The high-pressure containers can contain gas, liquid, or both. In embodiments, the plurality of high-pressure containers contains water held at high pressure. In embodiments, the pump-energy storage subsystem and the pump-turbine recovery subsystem each comprise a homogeneous bank of energy modules. Homogeneous banks are comprised of the same kind of energy module. In embodiments, the homogeneous bank of energy modules provides a pooled energy system. In other words, like energy modules are pooled together to provide flexibility and reliability for the system. A system can be comprised of multiple sets of different kinds of homogeneous energy modules, thus providing a heterogeneous set of homogeneous energy modules.

The system 200 can include a pump-turbine system that utilizes compression-expansion chambers 250 The compression-expansion chambers can include a rigid structure such as a tank with a piston for increasing or decreasing tank volume. The compression-expansion chambers can include a "soft" structure such as a bladder. The bladder can include a capsule, an accordion-fold bag, an expandable bag, and so on. In embodiments, the compression-expansion chambers of the system 200 can include heat exchangers 260. Recall that temperature is related to pressure; the temperature of a gas increases when it is compressed and decreases when it is decompressed. The amount of heating and cooling can be significant, where the heating can be sufficient to cause a liquid such as water to boil, or where the cooling can be sufficient to cause the liquid such as water to freeze. In embodiments, the pump-turbine system can utilize a water heat exchanger. The thermal energy extracted by the heat exchangers can be stored as steam, an ice slurry, solid nitrogen, etc. In embodiments, the water heat exchanger can provide heat control for one or more energy modules within the energy storage system. The heat control can be used to keep an energy module from overheating, from freezing up, etc. The system 200 can include a pump-turbine system that utilizes a compressed air chamber 240. The compressed air chamber can be located on land, submerged in liquid such as fresh water or sea water, and so on. In embodiments, the compressed air storage is underground. The compressed air storage can be implemented within a non-productive oil well infrastructure. The compressed air chamber can be facilitated by deep water pressure. That is, by locating the compressed air chamber at a depth such as 100 meters or greater, the pressure exerted by the water on the compressed air chamber can greatly enhance the storage capabilities of the compressed air chamber. In embodiments, the compressed air storage can be under seawater.

Figure 3A:
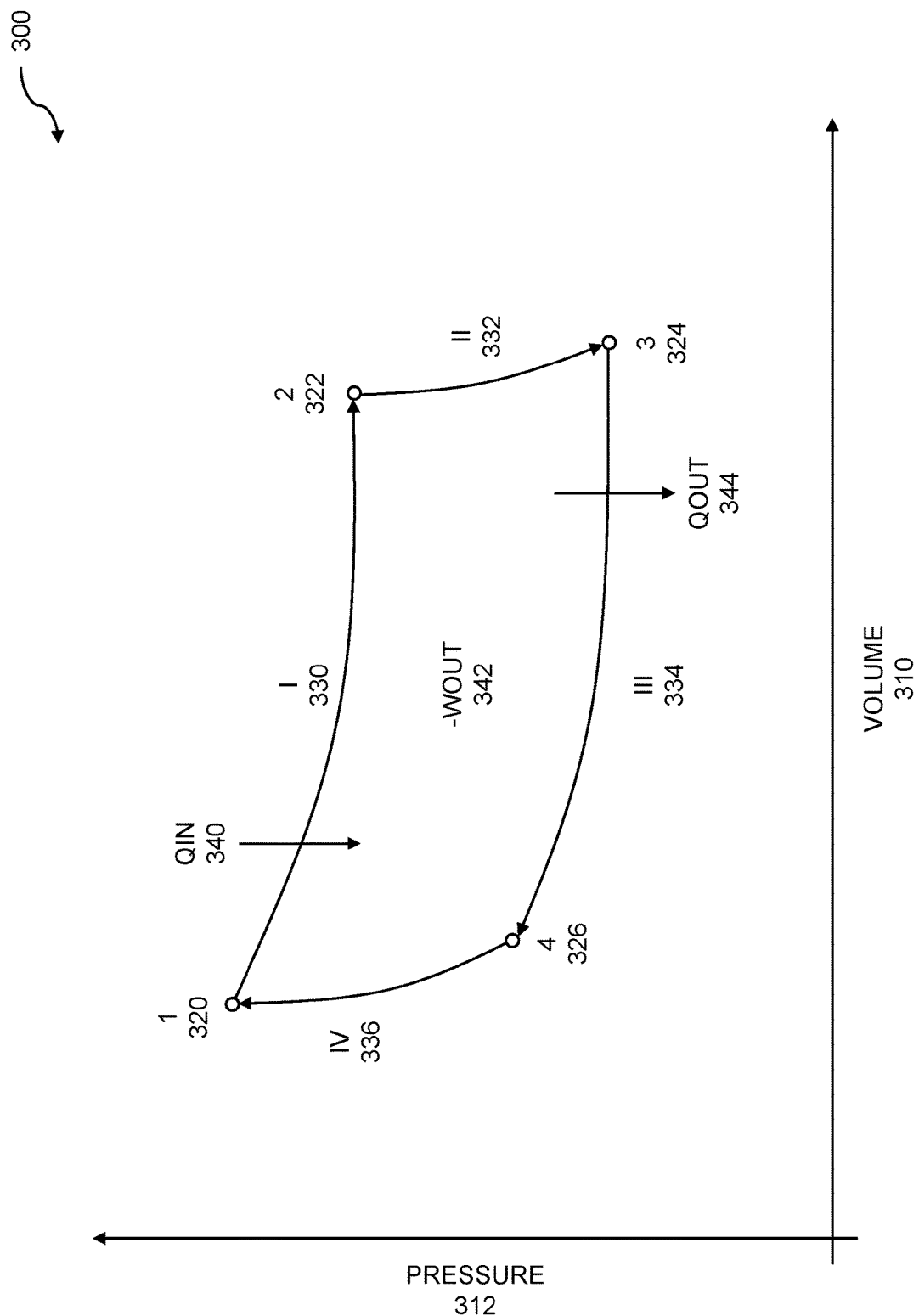
FIG. 3A illustrates adiabicity in a heat transfer cycle.

FIG. 3A illustrates adiabicity in a heat transfer cycle. An adiabatic process can occur when neither heat nor mass of a material is transferred between a given thermodynamic system and the environment surrounding the thermodynamic system. "Adiabicity" can describe a quality of the adiabatic process. For the techniques described herein, an adiabatic process with adiabicity equal to zero percent is described as perfectly isothermal, while an adiabatic process with adiabicity equal to 100 percent is described as perfectly adiabatic. Adiabicity in a heat transfer cycle supports energy storage and management using piping. An energy source is connected to a pump-turbine energy management system, where the pump-turbine energy management system includes a pump-energy storage subsystem. Energy from the energy source is stored in the pump-energy storage subsystem. One or more processors are used to calculate a valve-based flow control setting for recovering energy from the pump-energy storage subsystem. One or more valves in the pump-energy management system are energized, where the energizing enables energy recovery. Energy is recovered from the pump-energy storage subsystem using a pump-turbine recovery subsystem enabled by the one or more valves that were energized.

An isothermal adiabatic process can be achieved by adding heat to an endothermic portion of the cycle, such as expansion, and/or extracting heat from an exothermic portion of the cycle, such as compression. Excess heat that would normally be wasted and excess cooling that would normally be wasted, both of which would move a process out of an isothermal cycle, can be harnessed using a waste-heat recovery subsystem that includes one or more heat exchangers. In embodiments, the one or more heat exchangers enable converting water to steam. The water to steam conversion can be accomplished by spraying cold water into an exothermic process to maintain isothermality in an adiabatic system. In embodiments, the one or more heat exchangers enable converting water to ice. The water to ice conversion can be accomplished by spraying hot water into an endothermic process to maintain isothermality in an adiabatic system. In an adiabatic system, $PV^\gamma=k$, where P is pressure, V is volume, k is a constant of adiabicity, and gamma ($\gamma$) is a volumetric exponent that typically ranges from 1 to 1.4, where $\gamma=1.0$ represents an isothermal or near isothermal process and $\gamma=1.4$ represents an adiabatic or near adiabatic process. As can be appreciated by one skilled in the art, perfectly isothermal or adiabatic processes are not practiced in typical thermodynamic structures, but processes can nonetheless be referred to as "isothermal" or "adiabatic" when they approach the theoretical limits within 10% to 30%.

The figure shows a pressure-volume (PV) diagram 300. A PV diagram can be used to show changes in pressure 312 versus volume 310 for one or more thermodynamic processes. A cycle, such as a heat transfer cycle, can be based on the one or more thermodynamic processes. One lap around the cycle can complete the cycle, where the completed cycle can result in no net change of system state. With reference to the PV diagram, at the end or completion of the cycle, the thermodynamic system state returns to a pressure and a volume equal to the pressure and the volume of the system at the beginning of the cycle. Four states are shown: state 1 320, state 2 322, state 3 324, and state 4 326. Each state 1 through 4 represents a pressure and a corresponding volume. While four states are shown, other numbers of states may be present for a given cycle. A path between two states can represent a process. Four processes are shown: process I 330, process II 332, process III 334, and process IV 336. While four processes are shown, other numbers of processes may be present within a given cycle.

A given process can affect a system pressure, a system volume, or both a system pressure and a system volume. For the heat transfer cycle shown, the processes can be isothermal such as process I and process III, or adiabatic such as process II and process IV. In general, the four processes shown can include isothermal expansion, such as between points 1 and 2; reversible adiabatic or isentropic expansion, such as between points 2 and 3; reversible isothermal compression, such as between points 3 and 4; and reversible adiabatic or isentropic compression, such as between points 3 and 4. Using the first law of thermodynamics, for a closed system, an amount of internal energy of the closed system can be calculated based on a quantity of input heat, such as input heat qin 340 minus an amount of work performed by the system, such as −wout 342. Any heat removed from the system, such as output heat qout 344 can be determined to be equal to the quantity of input heat minus work.

Figure 3B:
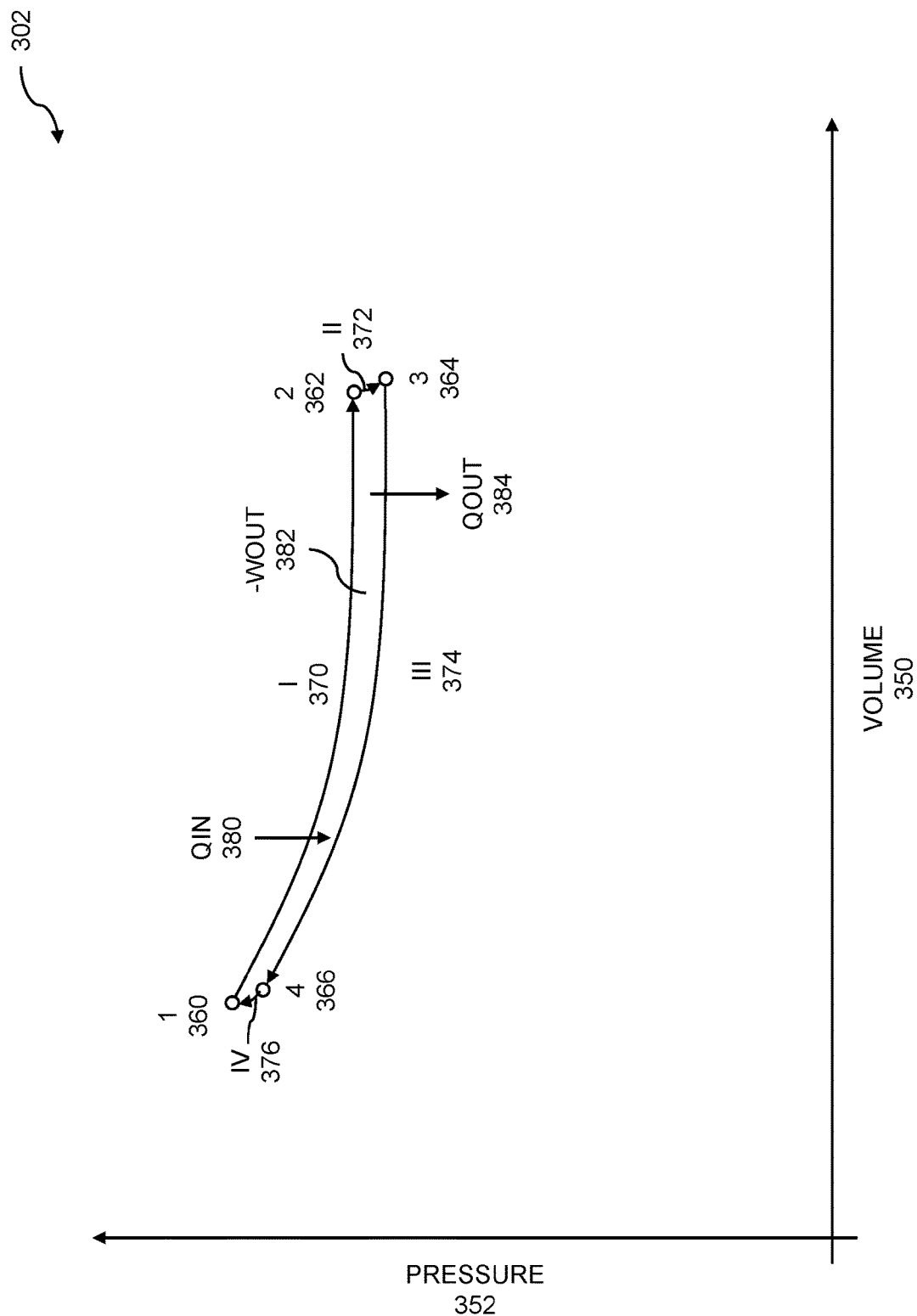
FIG. 3B illustrates an isothermal heat transfer cycle.

FIG. 3B illustrates an isothermal heat transfer cycle. A cycle of a thermodynamic system can include one or more thermodynamic processes. The thermodynamic processes can include isothermal processes and adiabatic processes. When the adiabicity of adiabatic processes is nearly equal to zero, then the thermal dynamic system can be described approximately as an isothermal system. An isothermal heat transfer thermodynamic system can support energy storage and management using piping. An energy source is connected to a pump-turbine energy management system. The pump-turbine energy management system includes a pump-energy storage subsystem. Energy from the energy source is stored in the pump-energy storage subsystem. Processors are used to calculate a valve-based flow control setting for recovering energy from the pump-energy storage subsystem. Valves in the pump-energy management system are energized to enable energy recovery. Energy is recovered from the pump-energy storage subsystem using a pump-turbine recovery subsystem enabled by the energized valves.

A pressure-volume (PV) diagram is shown in the FIG. 302. The PV diagram can plot pressure versus volume, and can show one or more states, where each state 1 through 4 comprises a pressure 352 and a corresponding volume 350. Four states are shown: state 1 360, state 2 362, state 3 364, and state 4 366. While four states are shown, other numbers of states may be present for a given cycle. A path between two states can represent a process. A process can include an isothermal process or an adiabatic process. A given process can impact the thermodynamic system by changing pressure, volume, or both pressure and volume. Four processes are shown: process I 370, process II 372, process III 374, and process IV 376. While four processes are shown, other numbers of processes may be present within a given cycle. For the isothermal heat transfer cycle shown, process I and process III can be isothermal. The adiabatic processes, process II and process IV can be as close to zero possible. The adiabatic processes II and IV can have an adiabicity nearly equal to zero. Recall that for a closed thermodynamic system, an amount of internal energy of the closed system can be calculated based on a quantity of input heat, such as input heat qin 380 minus an amount of work performed by the system, such as −wout 382. Any heat removed from the system, such as output heat qout 384 can be determined to be equal to the quantity of input heat minus work.

Figure 4:
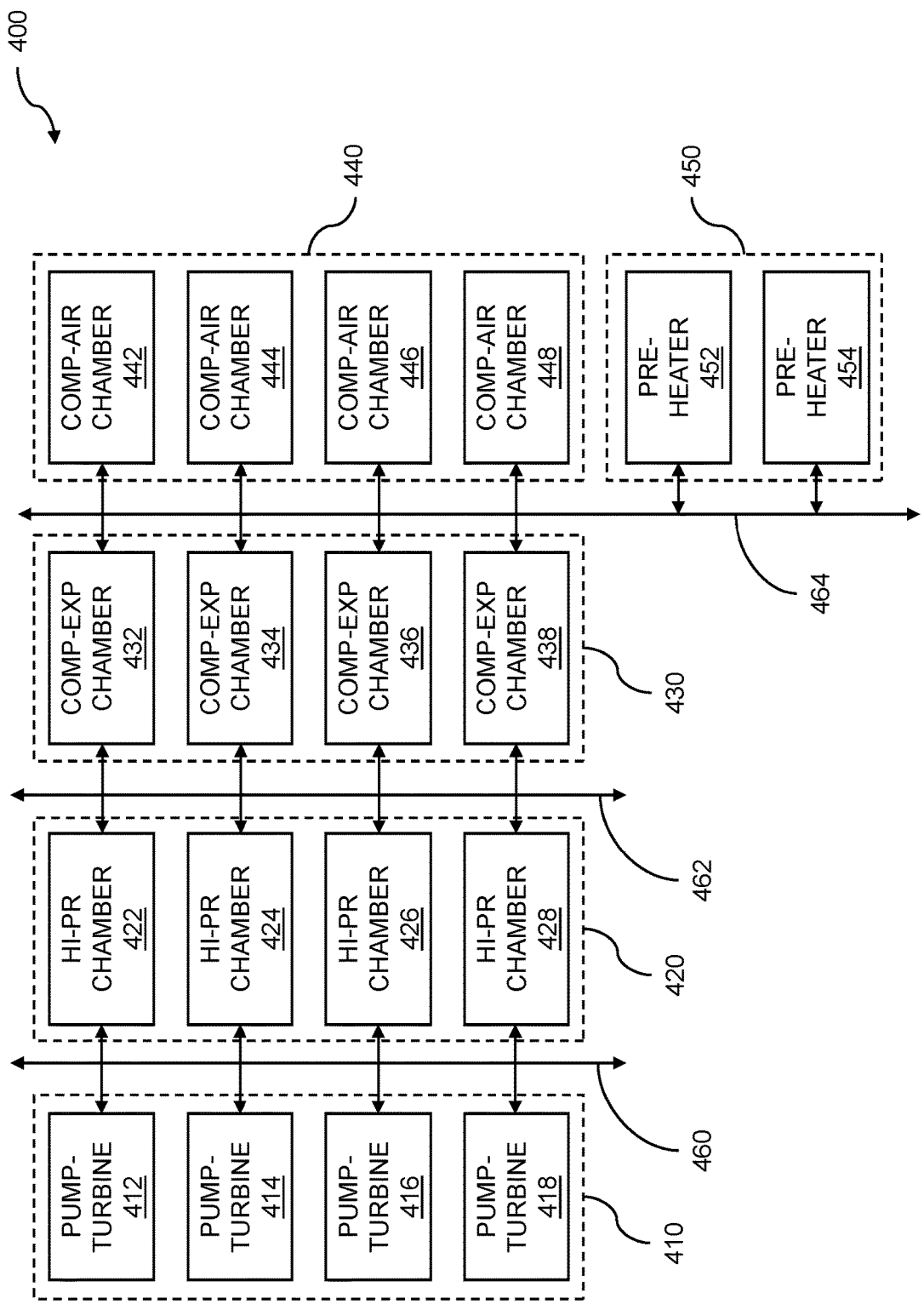
FIG. 4 shows energy storage pooling with architectural modularity.

FIG. 4 shows energy storage pooling with architectural modularity. Pooling of energy modules, which can include energy module peers, supports energy storage and management. Energy storage pooling 400 enables an energy management system to adapt based on changing energy demands, the number of various energy module peers available, and so on. The pooling enables the energy management system to operate using a quantity of energy modules appropriate to meeting energy needs. States of the energy modules can include different states of operation such as on or off, a percentage of maximum capacity, etc. The energy modules can be operated with substantially similar or different parameters such as pressures, temperatures, flowrates, and so on. The energy modules can be added to or removed from the energy system while the system is "hot". That is, the module additions or subtractions can be made without disrupting operation of the energy system. This "hot swapping" of modules can also be used to support maintenance of the energy modules.

An example including energy storage pooling with architectural modularity is shown. The architecture can include various energy module peers. The energy module peers can include one or more pump-turbine peers 410, high-pressure chamber peers 420, compression-expansion chamber peers 430, or compressed-air chamber peers 440. The pooling of the types of peers can include modules comprising one or more peers. The pump-turbine peers 410 can include pump-turbines 412, 414, 416, and 418; the high-pressure chamber peers 420 can include high-pressure chambers 422, 424, 426, and 428; the compression-expansion peers 440 can include compression-expansion chambers 432, 434, 436, and 438, and the compressed-air chamber peers can include compressed-air chambers 442, 444, 446, and 448. The architectural modularity of the energy system can enable addition or subtraction of peers as the capabilities of the peers are needed to meet energy demands. An example of the architectural modularity includes preheater peers 450. The preheater peers can include preheater 452 and preheater 454. The preheaters can include an external fuel supply for each peer (not shown). The various architectural modules can be interconnected. The interconnections, such as interconnections 460, 462, and 464, can include one or more interconnections between architectural modules. The interconnections can include pipes for transporting gases or liquids, cables for transferring charge, and so on.

Figure 5:
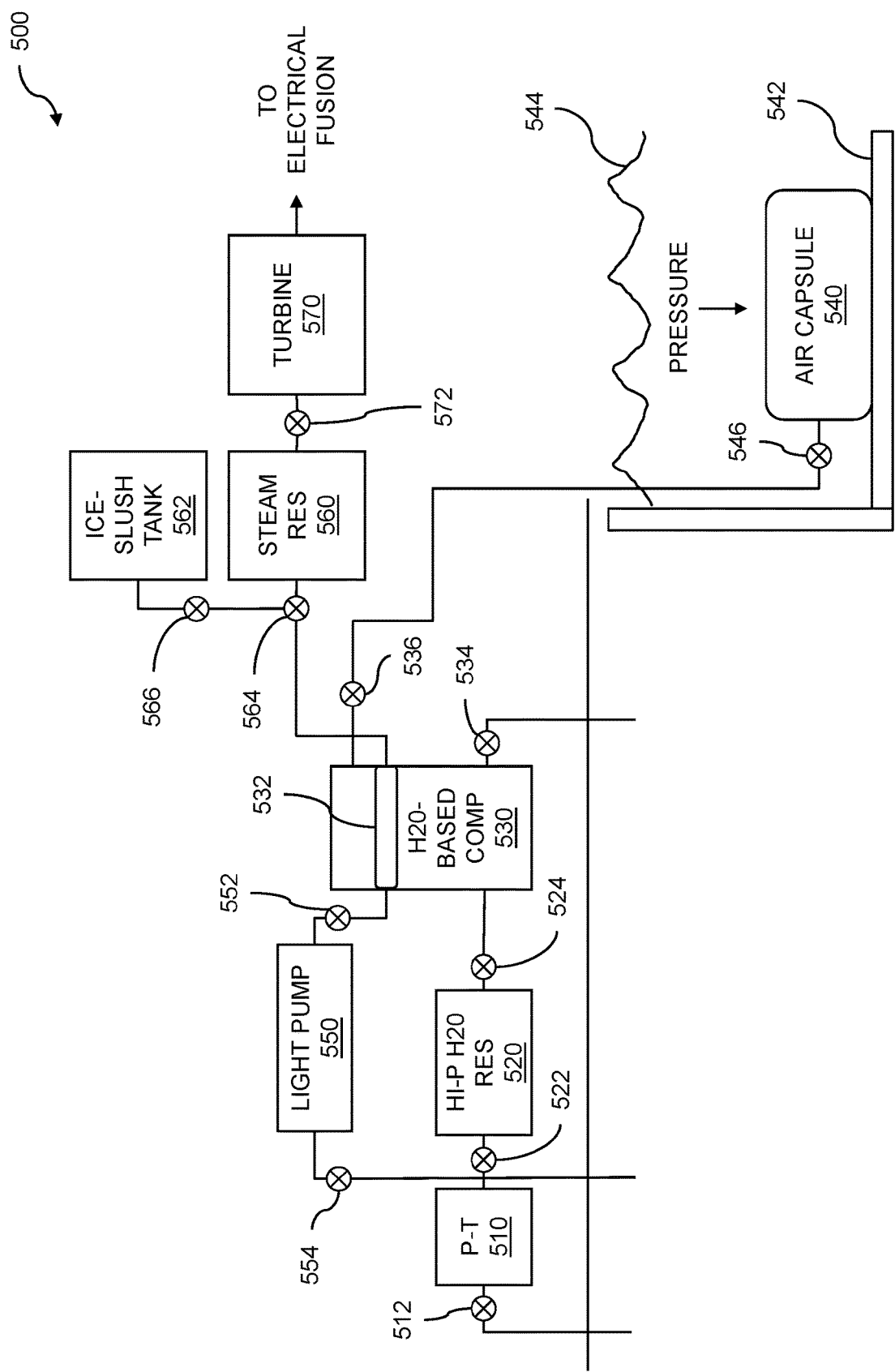
FIG. 5 illustrates pump-energy storage.

FIG. 5 illustrates pump-energy storage 500. Pump-energy storage supports energy storage and management using pumping. Pump-energy storage comprises various modules which can store energy of various types. The types of energy that can be stored can include electrical energy, thermal energy, kinetic energy, mechanical energy, and so on. Pump-energy storage can include a pump-turbine 510. The pump-turbine can be used to pressurize a storage vessel such as a tank, capsule, bladder, and so on. The pump-turbine can be operated electrically to move or pressurize a liquid or gas. The pump-turbine can also be operated by releasing pressure from the storage vessel for stored energy extraction. The pump-energy storage can include a high-pressure water reservoir 520. The high-pressure water reservoir can be used to provide pressurized water which can exert pressure on a gas such as air, nitrogen, etc. The pump-energy storage can include water-based high compression 530. The water-based high compression can be accomplished with a vessel such as 530, where water (at the bottom of the vessel) is isolated from a gas such as air (at the top of the vessel) by an interface, barrier, membrane, sack, and so on. The high-pressure water from the high-pressure water reservoir can be used to increase the volume of pressurized water in 530 thus increasing the pressure of the air. The water-based compression can include a heat exchanger 532. As the pressure of the air at the top of 530 is increased, the temperature of the air can be increased. The exchanger can be used to extract and store that waste heat from the air. A light pump 550 can be used to move the heat extracted from the water-based compression. In embodiments, the heat exchanger can include a water heat exchanger. The light pump can move the heated water for storage.

The pump-energy storage can include an air capsule 540. The air capsule can be located on land, at the bottom of a body of water 542, beneath a seabed, in unused oil infrastructure such as an oil well, etc. The air capsule can be pressurized by a hydraulic head. The hydraulic head can be determined by the distance between the surface of the body of water 544 and the bottom of the body of water 542. The body of water can include fresh water or seawater. In embodiments, the distance between the water surface and the bottom can be 100 meters or greater. The pump-energy storage can include storage for thermal energy. Thermal energy can be stored in a steam reservoir 560 as heat, in an ice-slush tank 562 as cold, and so on. The pump-energy storage can include a turbine 570. Steam from the steam reservoir can be used to spin a turbine to generate electricity. The generated electricity can be returned to an electrical grid, distributed to an electrical micro-grid, used on-site to meet energy demand, and so on.

The pump-turbine 510, high-pressure water tank 520, water-based high compression chamber 530, air capsule 540, ice-slush tank 562, steam reservoir 560, turbine 570, light pump 550, and other pump-energy storage elements, can be interconnected using pipes, lines, hoses, etc. The flow of air, water, steam, cold water (from the ice-slush), refrigerant, and so on, can be controlled by valves. Valve 512 enables water to enter or leave the pump-turbine 510. Valve 522 couples the pump-turbine to the high-pressure reservoir 520 for water flow. Valve 524 enables high-pressure water flow between the high-pressure water reservoir and the water-based compression chamber 530. Valve 552 enables liquid (water, refrigerant, etc.) to flow between the heat exchanger 532 and the light pump 550. Valve 554 enables liquid to enter or leave the light pump. Valve 534 enables water to enter (charge) or leave (discharge) the water-based compression chamber. Valves 536 and 546 enable the flow of pressurized air from the water-based compression chamber 530 to the submerged air capsule 540. Valve 564 enables flow of water from the heat exchanger 532 to the steam reservoir 560 when the water has high thermal energy (hot). Valve 566 enables flow of water from the heat exchanger 532 to the ice-slush reservoir 562 when the water has low thermal energy (cold). Valve 572 enables flow of steam from the steam reservoir to the turbine 570. Electrical energy can be generated by spinning the turbine with steam.

Figure 6:
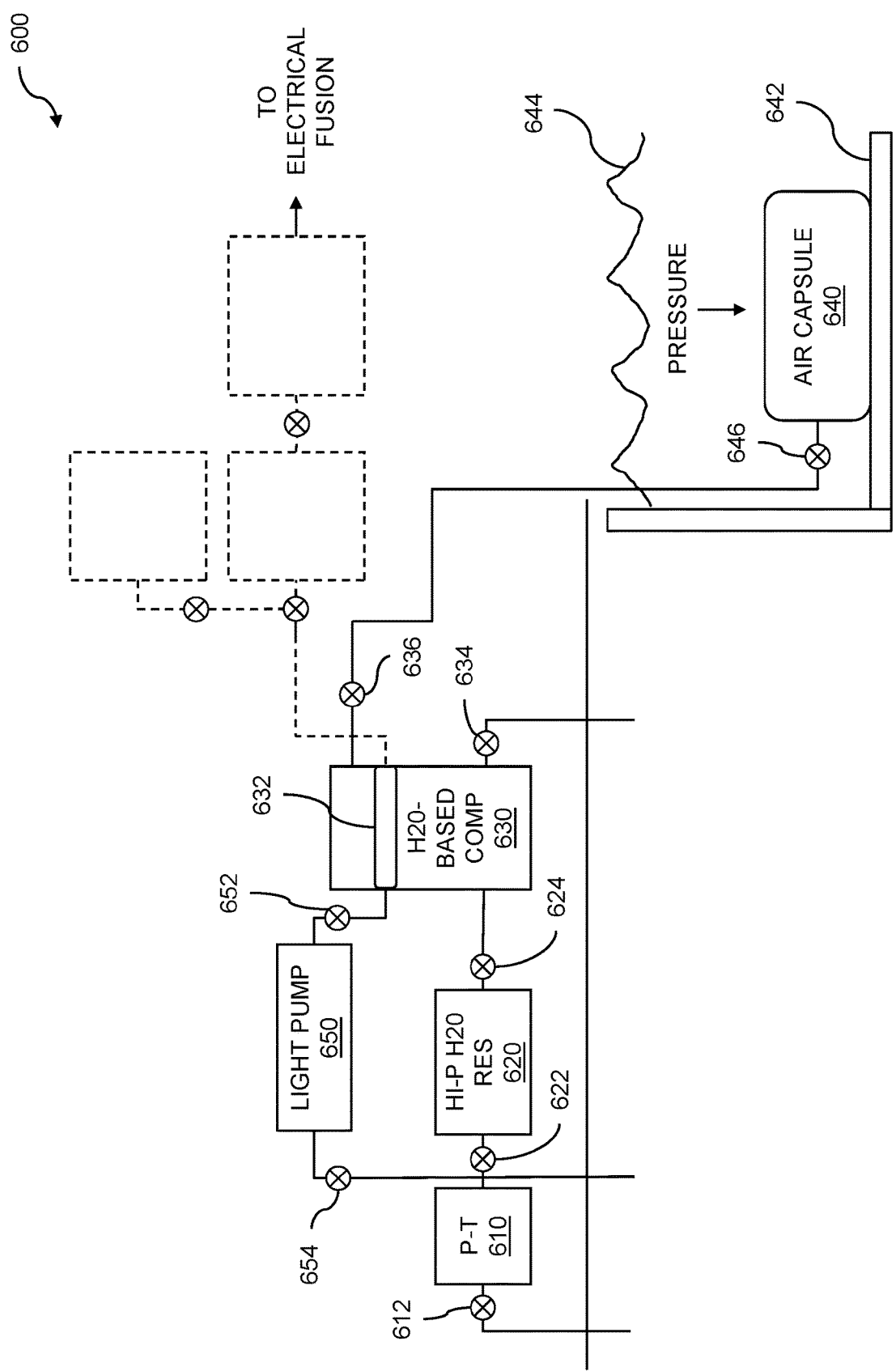
FIG. 6 shows pump-energy storage operation.

FIG. 6 shows pump-energy storage operation 600. Energy storage and management using pumping can include storing of energy. Pump-energy storage techniques have been described elsewhere. The storage operation comprises a subset of the operations performed for pump-energy storage. Valve 612 is energized to permit water to flow into a pump-turbine 610. The pump-turbine operates to pump water through valve 622 to pressurize or maintain pressure on a high-pressure water reservoir 620. The water from the high-pressure water reservoir can flow through valve 624 to increase pressure on air in a water-based compression chamber 630. The air from 630 can flow through valve 636 and valve 646 and can be used to inflate or pressurize an air capsule 640. The air capsule can be located below the surface 644 of a body of water and on the bottom 642 of that body of water. Pressure of the water above the air capsule (hydraulic head) can maintain pressure on the air capsule. Valve 634 can be energized to release pressurized water from the water-based compression chamber when the air in the chamber has been exhausted by transferring the air to the air capsule. Heat generated by compressing air in the water-based compression chamber can be extracted using a heat exchanger 632, as discussed elsewhere. The heat exchanger can include a water heat exchanger. Water can be moved through valve 654 by a light pump 650. The pumped water can move through valve 652 to the heat exchanger 632 where the water can be heated or cooled. The heated or cooled water from the water heat exchanger can be stored.

Figure 7:
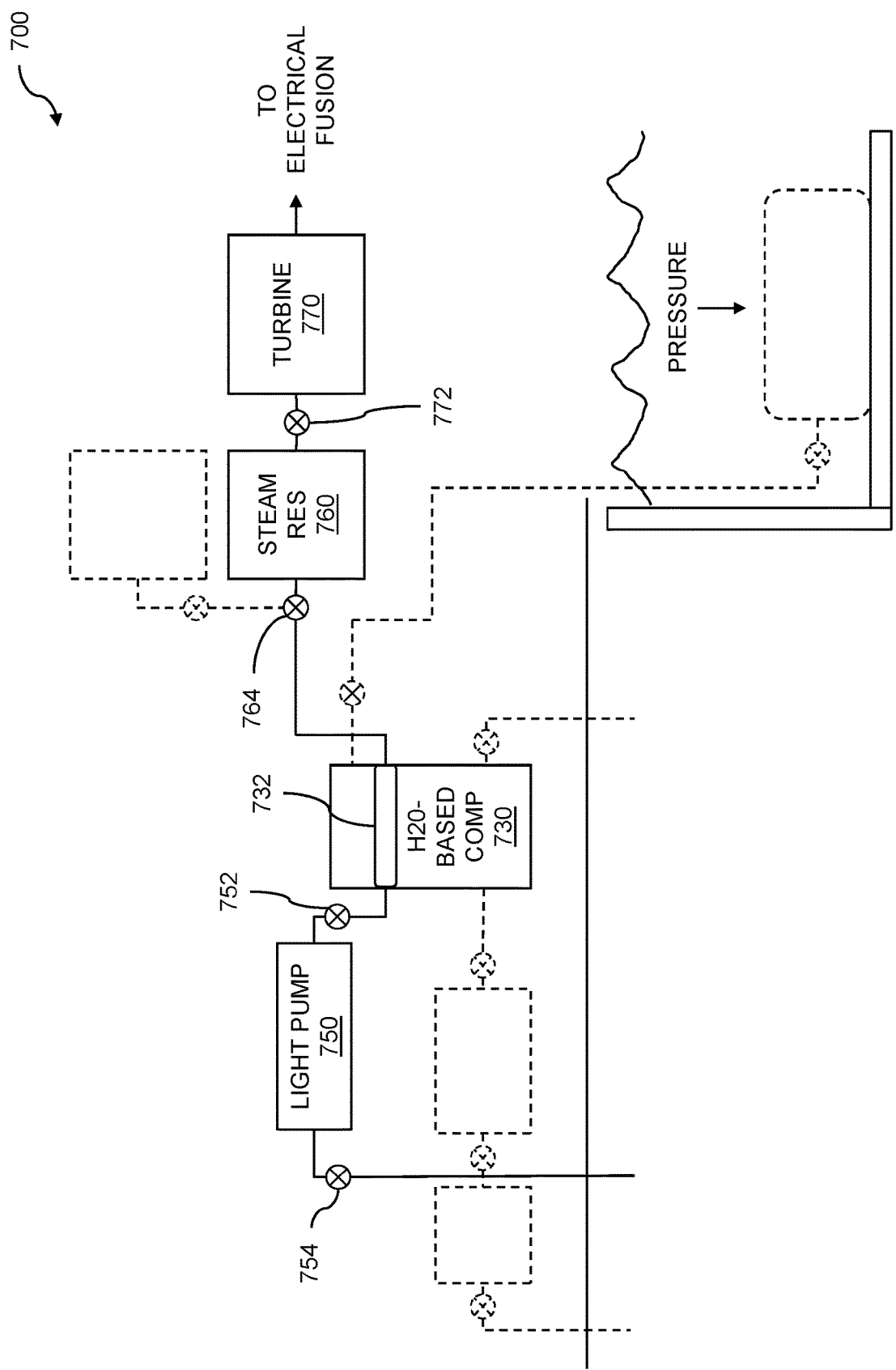
FIG. 7 illustrates waste heat recovery operation to steam.

FIG. 7 illustrates waste heat recovery operation 700 to steam. Compressing a gas causes the temperature of the gas to rise (Ideal Gas Law). The waste heat, or thermal energy, generated by compressing air in a chamber can be recovered and stored for later uses. The later uses can include using the thermal energy for preheating, converting the thermal energy to another form of energy such as electrical energy, and so on. Recovering the heat from the gas can support energy storage and management using pumping. Waste heat recovery comprises a subset of the operations performed for pump-energy storage. When heat is generated by compressing a gas such as air, nitrogen, or carbon-dioxide within a water-based compression chamber 730, the heat can be collected using a heat exchanger 732 and stored for later use. In embodiments, the heat exchanger can include a water heat exchanger. The water heated by the heat exchanger can be moved by a light pump 750. Feed water or another liquid can be passed through valve 754 to the light pump 750. The pumped water passes through valve 752 to heat exchanger 732 where the pumped water is heated. The heat extracted from the heated air in the water-based compression chamber can be pumped through valve 764 to heat water to steam in a steam reservoir 760. The steam from the steam reservoir can be passed through valve 772 to turbine 770, where the steam can be used to spin the turbine. The spinning turbine can generate electrical energy.

Figure 8:
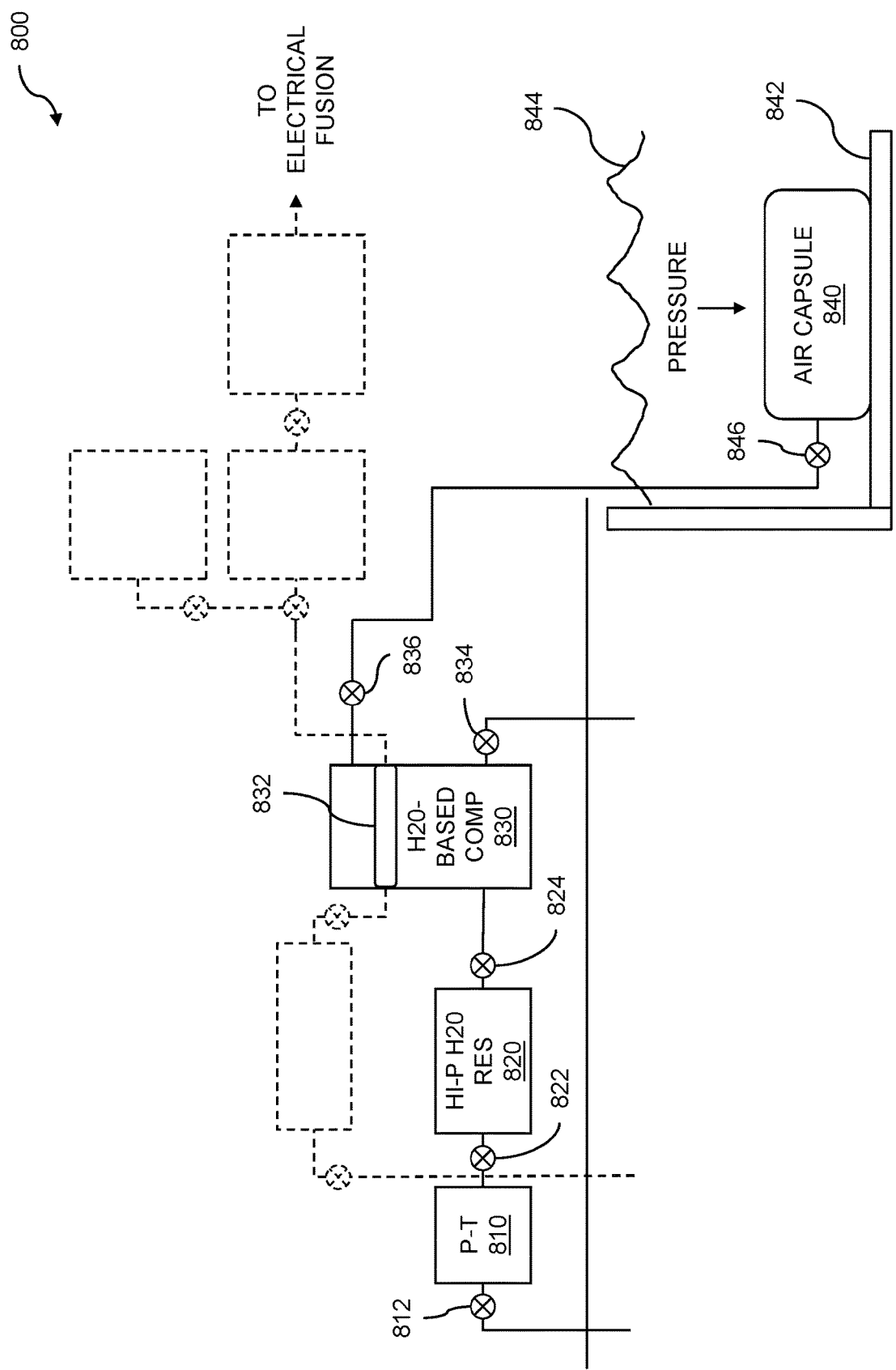
FIG. 8 shows pump-turbine energy recovery operation.

FIG. 8 shows pump-turbine energy recovery operation 800. Compressed gas such as air, nitrogen, or carbon-dioxide can be used for an energy recovery operation, where the energy recovery operation can convert the energy of the compressed gas to another energy type such as electrical energy. The energy conversion can support energy storage and management using pumping. An air capsule 840 can be located at the bottom 842 of a body of water, where the body of water can include fresh water, seawater, etc. Air or another gas can be expelled from the air capsule using pressure created by a hydraulic head, where the hydraulic head is proportional to the distance between the surface 844 of the body of water and the bottom 842 of the body of water. The distance between the water surface and the bottom can include 100 meters or more. The compressed air from the air capsule can be pressed through valves 846 and 836 to expand the volume of air within the water-based compression chamber 830. When heat is generated by compressing a gas such as air, nitrogen, or carbon-dioxide within a water-based compression chamber 830, the heat can be collected using a heat exchanger 832. In embodiments, the heat exchanger can include a water heat exchanger. Water can be provided to the water-based compression chamber through valve 834. Water from the water-based compression chamber can be transferred through valve 824 to a high-pressure water reservoir 820. The water transferred back to the high-pressure water reservoir can cause water to be pushed through valve 822 to pump-turbine 810, enabling the pump-turbine to spin. The spinning of the pump-turbine can generate electrical energy, thereby recovering electrical energy from the previously stored pressurized air or other gas. Excess water used to spin the pump-turbine can be expelled through valve 812.

Figure 9:
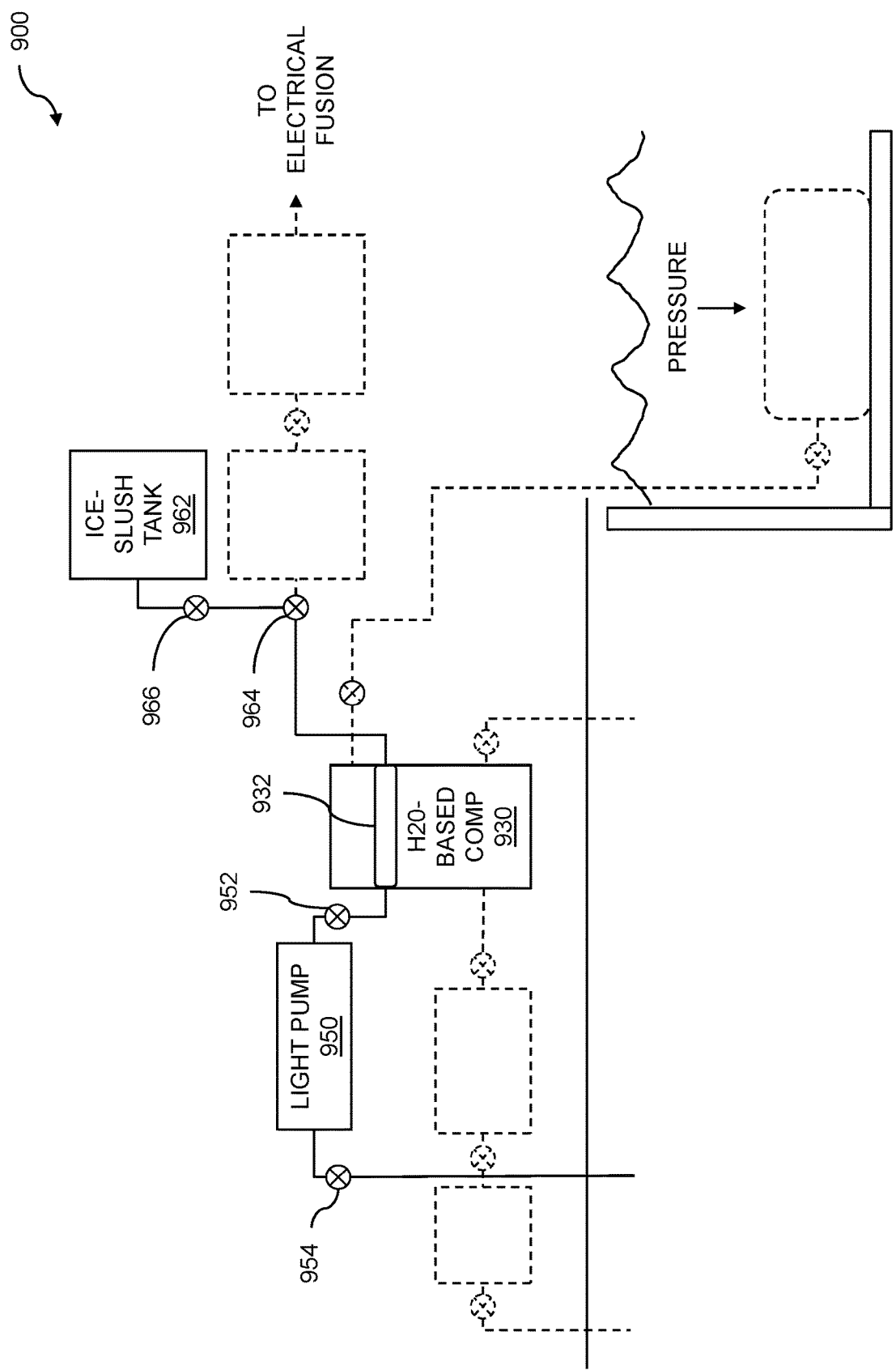
FIG. 9 illustrates waste heat recovery to ice-slush.

FIG. 9 illustrates waste heat recovery operation 900 to ice-slush. As the pressure on a gas decreases, the volume of the gas increases. Further, the temperature of the gas can decrease. The waste "cold" or low thermal energy can be recovered and stored for later use or can be converted to another form of energy. Recovering the low thermal energy from the expanding gas can support energy storage and management using pumping. Thermal energy recovery comprises a subset of the operations performed for pump-energy storage. The expansion or decompression of a gas such as air, nitrogen, or carbon-dioxide within a water-based compression chamber 930 can cause the temperature of the gas within the chamber to decrease. Water in the water-based compression chamber can be pushed back to a high-pressure water reservoir. This decrease in thermal energy in the water-based compression chamber can be collected using a heat exchanger 932. In embodiments, the heat exchanger can include a water heat exchanger. The water cooled by the heat exchanger can be moved by a light pump 950 and stored for later use. The thermal energy from the chilled air in the water-based compression chamber can be pumped to chill water, carbon-dioxide, nitrogen, etc., in an ice-slush tank 962. The water chilled by the heat exchanger can be moved by a light pump 950. Feed water or another liquid such as refrigerant can be passed through valve 954 to the light pump 950. The pumped water passes through valve 952 to heat exchanger 932 where the pumped water is chilled. The "cold" extracted from the chilled air in the water-based compression chamber can be pumped through valves 964 and 966 to chill water to ice or an ice-slush in an ice-slush tank 962. The ice or ice-slush from ice-slush tank can be used for purposes such as temperature control of compressing gases.

Figure 10:
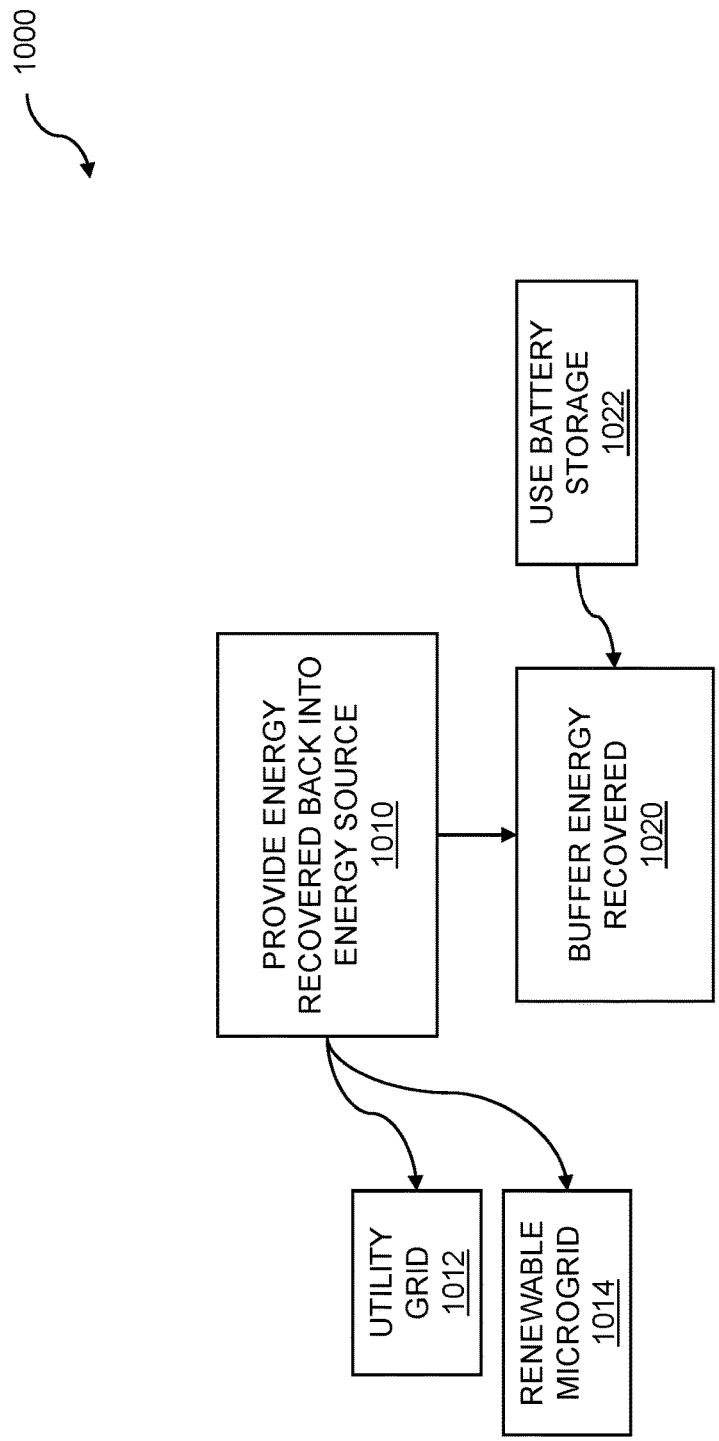
FIG. 10 is a flow diagram for recovered energy returned to an energy source.

FIG. 10 is a flow diagram for recovered energy returned to an energy source. An energy storage and management system flow diagram 1000 can include a variety of subsystems. The subsystems can include pump-turbine subsystems, high-pressure water subsystems, water-based compression subsystems, underwater air capsules, non-productive oil infrastructure, and so on. Energy can be recovered from a pump-energy storage subsystem using a pump-turbine recovery subsystem. The pump-turbine recovery subsystem can be enabled by the one or more valves that can be energized to allow the flow of a gas or a liquid between or among subsystems. The return of recovered energy to an energy source supports energy storage and management using pumping. The flow 1000 includes providing the energy recovered from the pump-turbine energy management system back into the energy source 1010. As discussed throughout, energy such as electrical energy can be converted to a form of energy that can be stored, where the storage of the energy can occur for a period of time. The equilibrium period of time that the energy can be stored can be a short-term basis or a long-term basis. In embodiments, the short-term basis is an integer number of seconds, minutes, hours, or days, wherein the integer number of seconds, minutes, hours, or days comprises a length of time substantially less than one week. In other embodiments, the long-term basis is an integer number of weeks, months, seasons, or years, wherein the integer number of weeks, months, seasons, or years comprises a length of time substantially more than one day.

The form of energy that can be stored can include potential energy from pressurized water or from pressurized air, electrical energy from electrical charge stored in batteries, and so on. The pressurized water or pressurized air can be used to spin the pump-turbine, where the spinning turbine can be used to produce electrical energy. The electrical energy that can be produced by the spinning turbine can be returned to an energy source. In embodiments, the energy source includes a utility grid 1012. The utility grid can include commercially generated electrical energy. In other embodiments, the energy source includes a renewable energy microgrid 1014. The renewable energy microgrid can include energy generated onsite, locally, and so on. The renewable energy microgrid 1014 can include one or more of a solar farm, a wind turbine farm, a tidal energy system, a wave energy system, or a bio-fuel system. Energy can be returned to a geothermal energy system by storing energy in a ground-based system. The flow 1000 further includes buffering the energy recovered 1020 from the pump-turbine energy management system. The buffering the recovered energy can include storing the recovered energy locally, onsite, etc. In embodiments, the buffering the recovered energy include using a battery storage subsystem 1022.

Figure 11A:
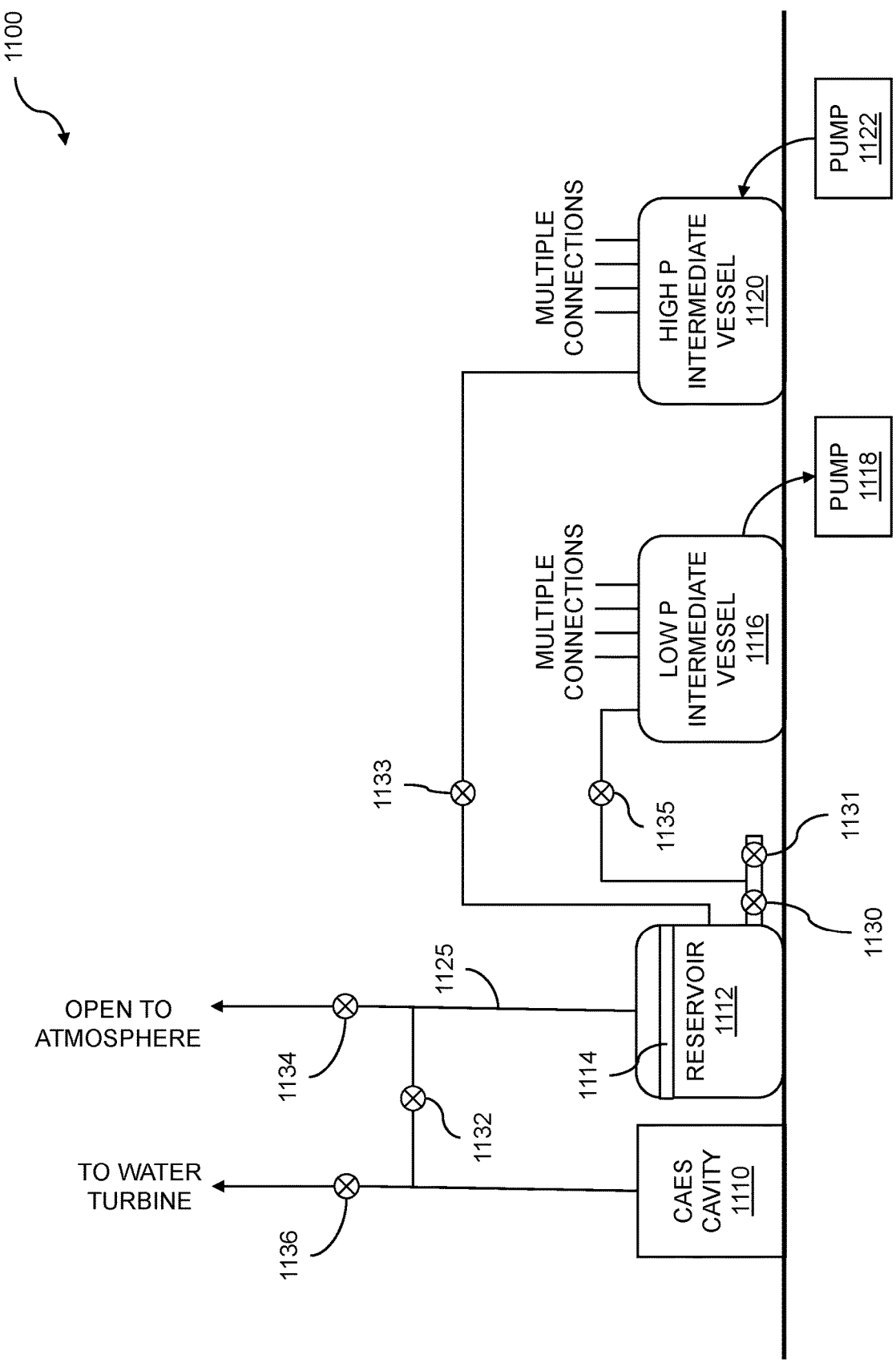
FIG. 11A illustrates charging operation for a compressed air energy system.

FIG. 11A illustrates charging operation for a compressed air energy system 1100. The compressed air energy system supports energy storage and management using pumping. An energy source is connected to a pump-turbine energy management system, where the pump-turbine energy management system includes a pump-energy storage subsystem. Energy from the energy source is stored in the pump-energy storage subsystem. One or more processors are used to calculate a valve-based flow control setting for recovering energy from the pump-energy storage subsystem. One or more valves in the pump-energy management system are energized, where the energizing enables energy recovery. Energy is recovered from the pump-energy storage subsystem using a pump-turbine recovery subsystem enabled by the one or more valves that were energized. The reservoir 1112 can be a pressure rated vessel which can be insulated to minimize heat losses from the vessel. In embodiments, the vessel is insulated from the inside. More than one vessel or reservoir can be used. All pressure vessels can be similarly insulated.

Reservoir 1112 is an example of a plurality of reservoirs which can operate in parallel or in tandem as dictated by the operating software. In a usage example, a starting point can include the reservoir 1112 full of air at atmospheric pressure. If the reservoir 1112 is situated below water level, water can be introduced through valves 1130 and 1131. When the water level has reached its equilibrium, 1130 and 1131 will be closed and pump 1122 will be used to introduce additional water into reservoir 1112 through an intermediate vessel 1116. If reservoir 1112 is situated above water, pump 1122 alone will introduce water into reservoir 1112. The purpose of vessel 1120 is to connect a single pump to a plurality of vessels similar to 1112. The plurality of vessels can serve the same purpose as vessel 1112. Pumped water can push the air into 1112 and can increase its pressure. The increasing pressure in 1112 can further cause the temperature of air in 1112 to increase. The heat exchanger 1114 can recover this heat of compression by converting water into steam or by converting some other working fluid from liquid into vapor. The heat exchanger 1114 may be internal or external to the reservoir 1112. The heat exchanger can be contained within line 1125. When the pumped water has compressed air in 1112 to a set-point, the valve 1132 can open and send the compressed air to a compressed air energy system (CAES) cavity 1110. This sending of compressed air can be done directly or through another heat recovery device such as an Organic Rankine Cycle (ORC) or conventional heat exchanger. When the air is transferred and pressure in 1112 equals pressure in 1110, valves 1132 and 1133 can be closed. Valves 1134 and 1135 can be opened. Pump 1118 can pump the water from 1112 to the environment and by doing so can thereby reduce the water level in 1112. When the water level reaches a lower level set-point, valves 1134 and 1135 can close and pump 1118 can shut off. Reservoir 1112 can be filled with atmospheric air, thus returning to the initial starting point. The process may be repeated until the pressure in CAES 1110 has reached target pressure. Valve 1136 can be opened to supply water to a water turbine.

Figure 11B:
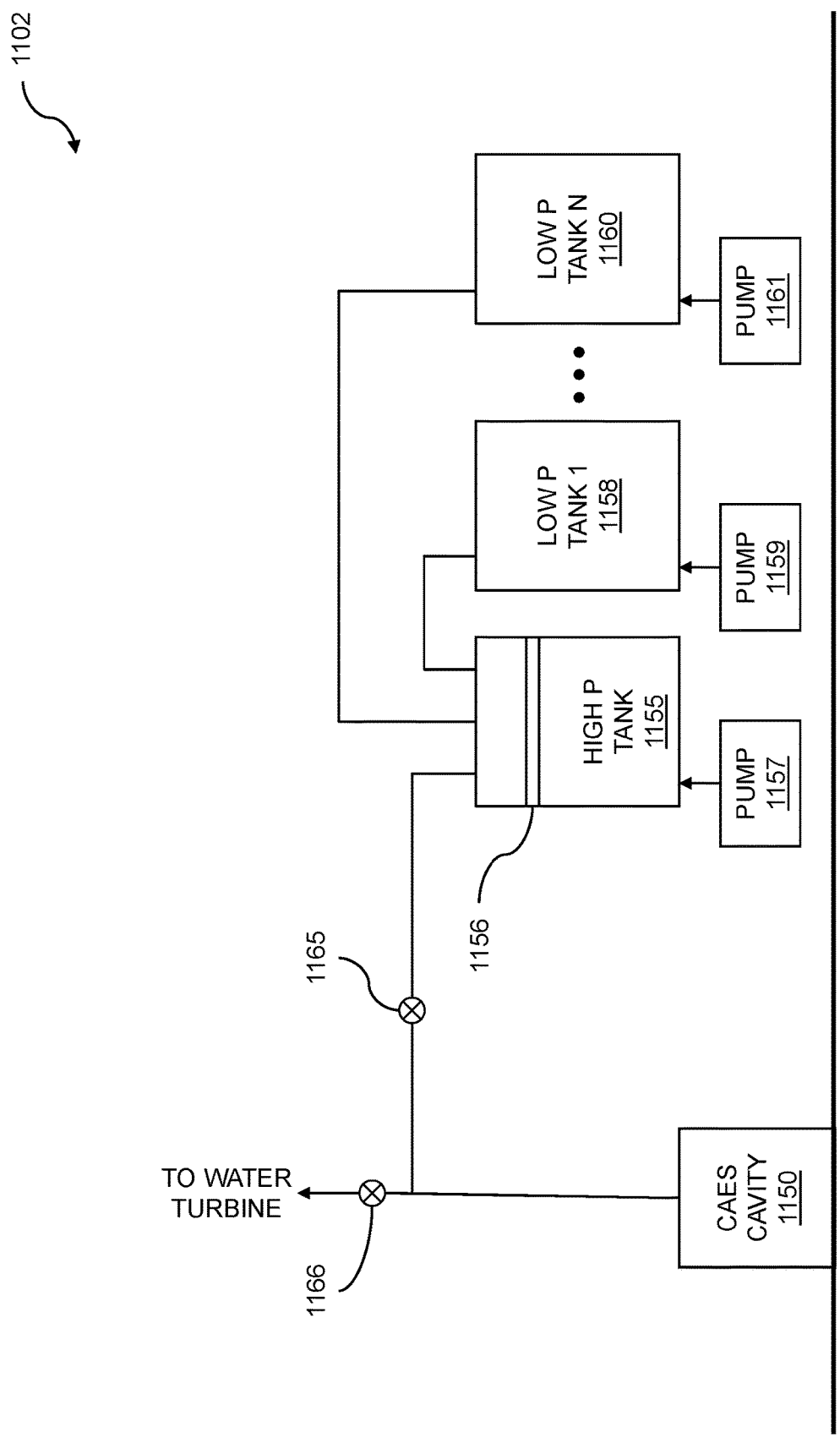
FIG. 11B illustrates multiple cells for unit cell operation.

FIG. 11B illustrates multiple cells for unit cell operation 1102. Unit cell operation supports energy storage and management using pumping. A pressure vessel of high capacity can be implemented by coupling one or more vessels to form a unit cell. A plurality of low pressure tanks, represented here by 1158 and 1160, can be charged with water in the manner as described elsewhere. The tanks can feed air into a high-pressure tank 1155. The pressure in Tank 1155 can increase from 1 atmosphere to approximately (n+1) atmospheres. When a pressure threshold or target has been achieved, the heat exchanger 1156 can start using the heat of compression to convert working fluid such as water from liquid to vapor or steam. The pump 1157 can pump water into 1155 to increase the pressure to a set-point. Similarly, pump 1159 can pump water into 1158 to increase the pressure to a set-point; or pump 1161 can pump water into 1160 to increase the pressure to a set-point. The heat exchanger 1156 can continue to extract heat resulting from compressing air. When the set-point is reached, the valve 1165 to the CAES cavity can open so that air can be pushed into 1150. This pushing of the air can be done directly or through another heat recovery device such as an ORC or conventional heat exchanger. The compressing and heat extraction can be repeated. When pressurized air within the CAES is needed for energy generation, valve 1165 can be closed and valve 1166 can be open. The pressurized air within the CAES can be directed to a turbine, used to pressurize water for a water turbine, and so on.

The steam or vapor produced in the heat exchanger can be pooled with steam/vapor produced by a plurality of heat exchangers. The pooled steam/vapor can be used to spin steam turbines to drive conventional generators to produce electricity. The hot pressurized air can be pre-cooled prior to admitting the hot pressurized air into the CAES cavity 1150, thus heating the water or the working liquid prior their conversion into steam or vapor to generate electricity. The pre-cooling or the heating can be accomplished using a conventional heat exchanger. When the electricity demand is higher than the available supply, or when the pricing is right, a software operating system can send a signal to switch from energy storage mode to energy harvest or recovery mode.

Figure 11C:
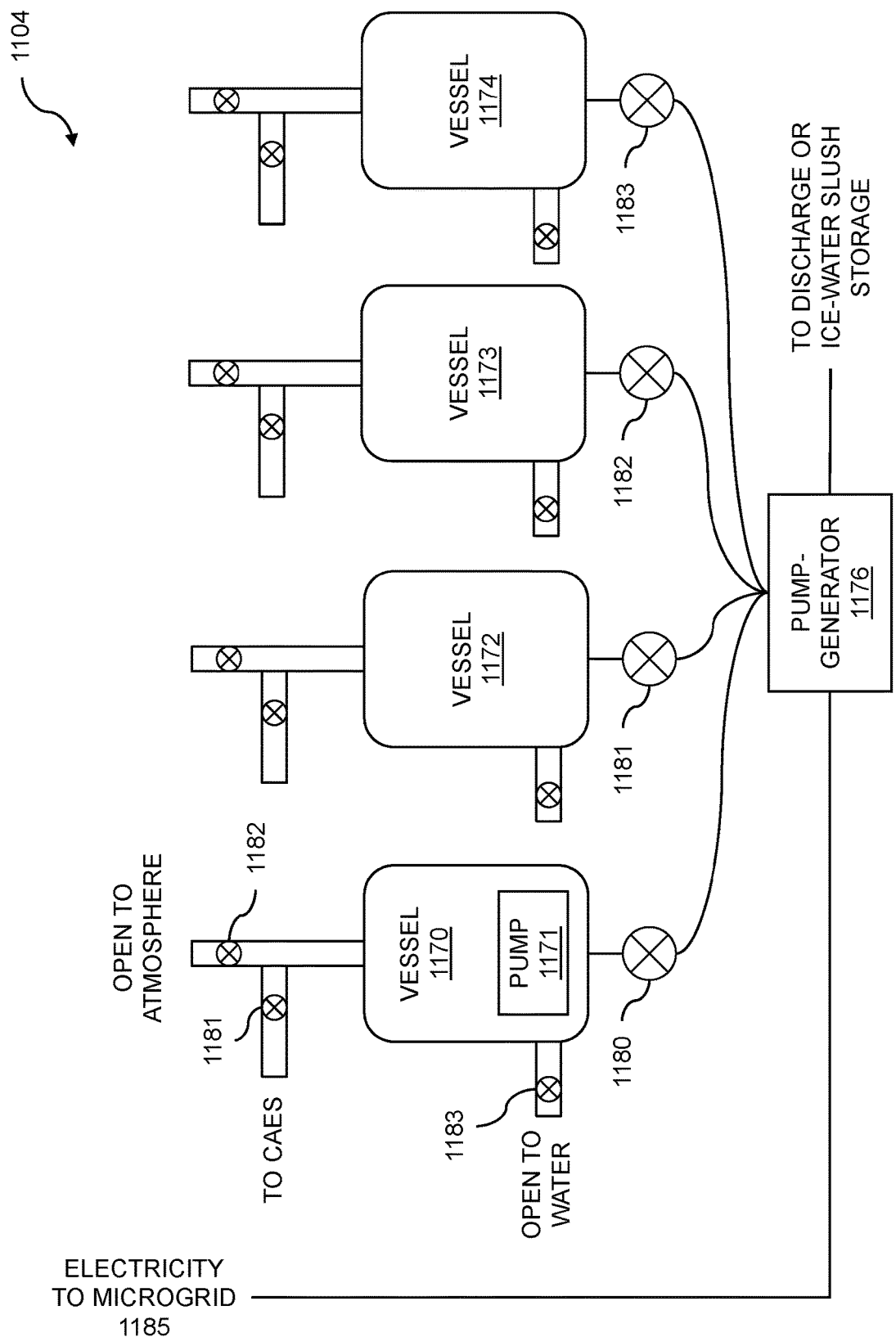
FIG. 11C illustrates power generation using expanding air.

FIG. 11C illustrates power generation using expanding air 1104. Expanding air, steam, liquids, and so on can be used for power generation. The power generation supports energy storage and management using pumping. Vessels 1170, 1172, 1173, and 1174 can represent a plurality of vessels working in concert as directed by a software operating system. The software operating system can be used to control the generation of energy such as electrical power from expanding air or another gas. A usage example for Vessel 1170 is described. Initially, a vessel 1170 is full of air at atmospheric pressure. Valve 1182 can be open. Valves 1183 and 1180 can be closed. Water can be introduced in the tank through valve 1183 until the water level within the tank reaches a high-level set-point. Valves 1182 and 1183 can be closed. Valve 1181 can be opened and can be used to pressurize the vessel 1170. When the pressure within the vessel equals that in a CAES, such as the CAES previously described, valve 1181 can be closed. Valve 1180 can be opened and can be used to drive the high-pressure water through the pump-generator 1176. The spinning of the pump-generator can be used for generating electrical energy. Similarly, valves corresponding to the other vessels can be opened to drive the high-pressure the pump-generator. Thus, valve 1181 can be opened to permit high-pressure water within vessel 1172 to be directed to the pump-generator; valve 1182 can be opened to permit high-pressure water within vessel 1173 to be directed to the pump-generator; or valve 1183 can be opened to permit high-pressure water within vessel 1174 to be directed to the pump-generator. More than one vessel may be so connected to the pump-generator. The electrical energy that is generated can be distributed to a distribution network such as an electricity microgrid 1185.

As water is being discharged from 1170, the temperature of air in 1170 can start to decrease. The decrease in temperature of the air can be rapid and significant. When the water level reaches a set-point, an internal pump 1171 can start spraying the water into the air space. The spraying of the water can result in heating of the air in the air space, by the sensible heat of water and by the latent heat of fusion. Water can be converted to ice (solid phase) or to ice-water slush (aqueous phase). The ice-water slush can be transferred to a separate holding vessel. Within the separate holding vessel, the ice-water slush from the plurality of vessels can be pooled. The ice-water slush can be used to provide refrigeration or cooling for other uses by the CAES system.

Figure 12:
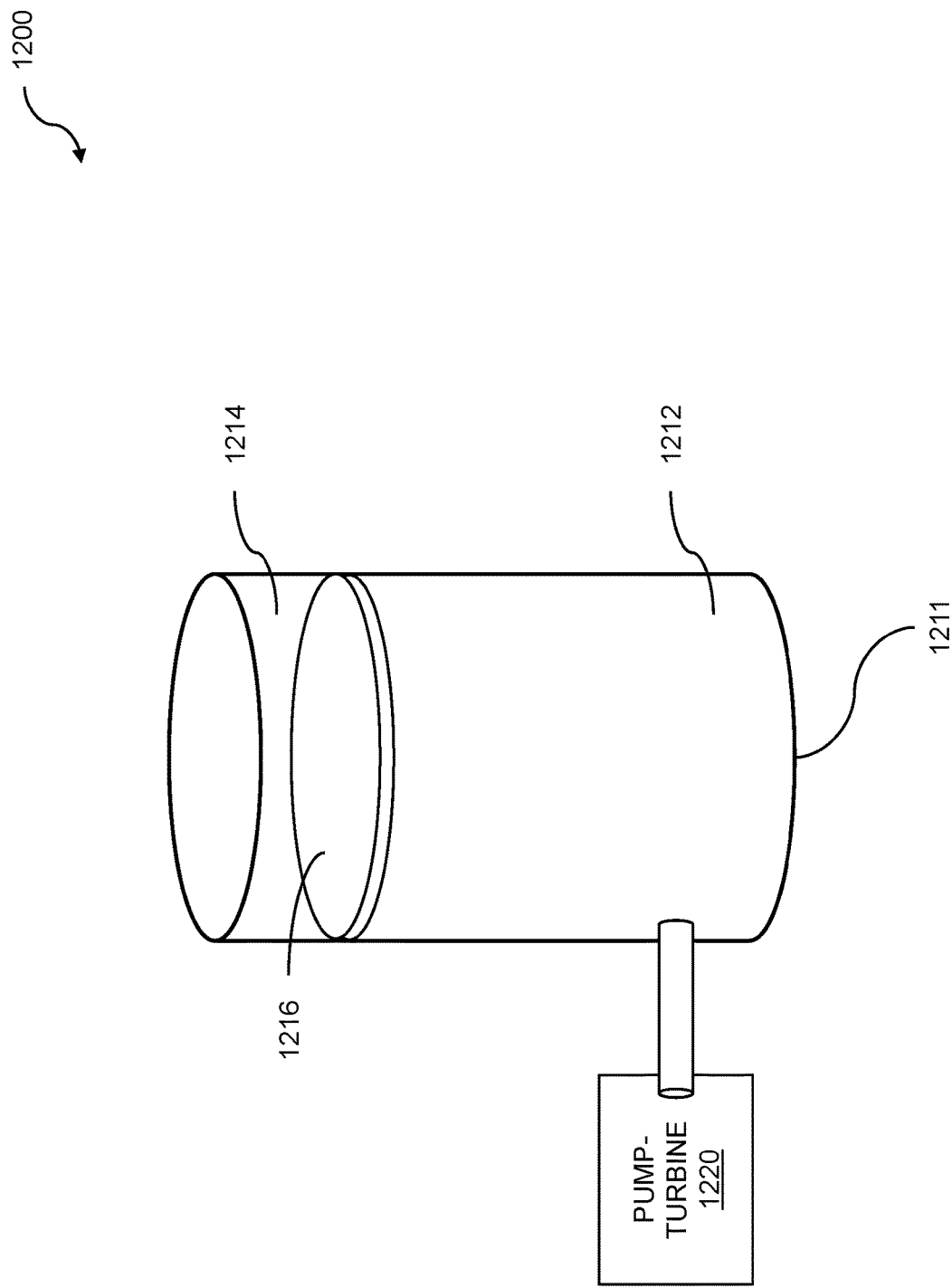
FIG. 12 shows a high-pressure water reservoir.

FIG. 12 shows a high-pressure water reservoir 1200. Water or another fluid can be pumped into a high-pressure water reservoir using a pump-turbine or other technique. The high-pressure water can be stored, used to provide water to a water-based high-compression chamber, released to spin the turbine of the pump-turbine, etc. The high-pressure water reservoir can support energy storage and management using pumping. A high-pressure water reservoir can include a vessel such as a cylinder 1211, a tank, a sphere, and so on. The high-pressure water reservoir can include water 1212 or another liquid, air 1214 or another gas, and a membrane, diaphragm, or other structure 1216 to separate the liquid from the gas. The liquid and the gas can be separated to prevent mixing, diffusion, etc. Liquid pumped into the high-pressure water reservoir by a pump-turbine 1220, pump, or other technique, causes the air or other gas to compress, thereby exerting pressure on the liquid. The water in the high-pressure water reservoir can be released from the reservoir back to the pump-turbine. The released water causes the turbine to spin, where the spinning turbine can be used to convert the hydraulic pressure of the high-pressure water to another energy form such as electrical energy.

Figure 13:
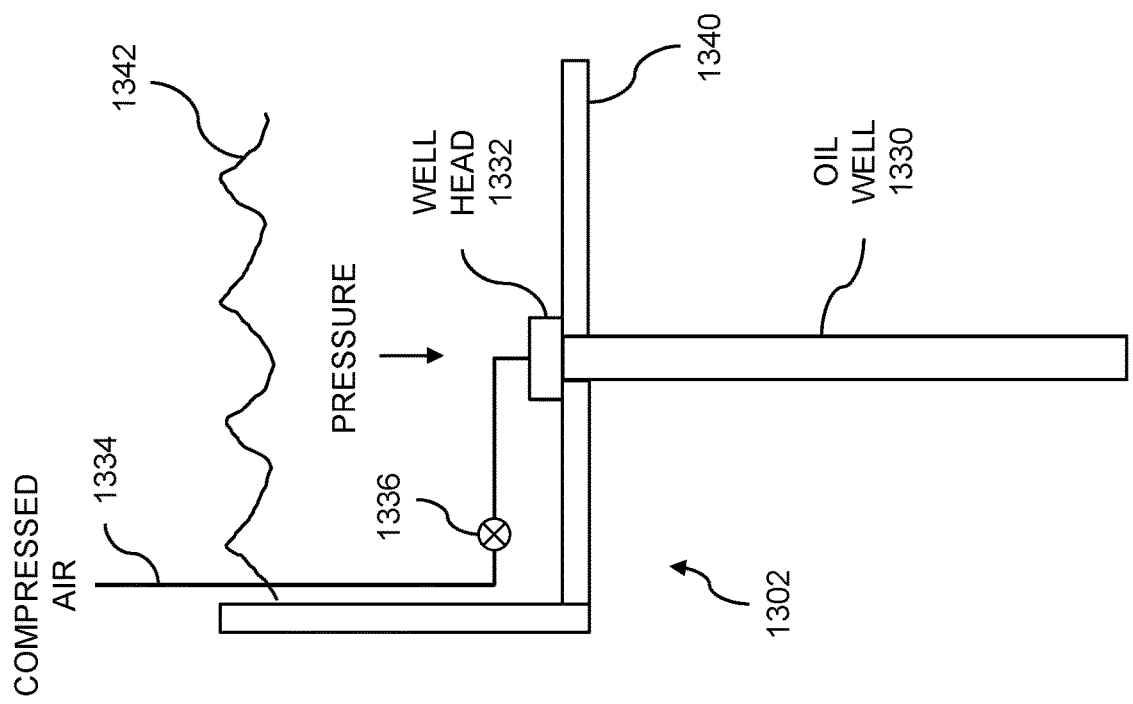
FIG. 13 illustrates underwater pressurized-air storage.
Figure 13:
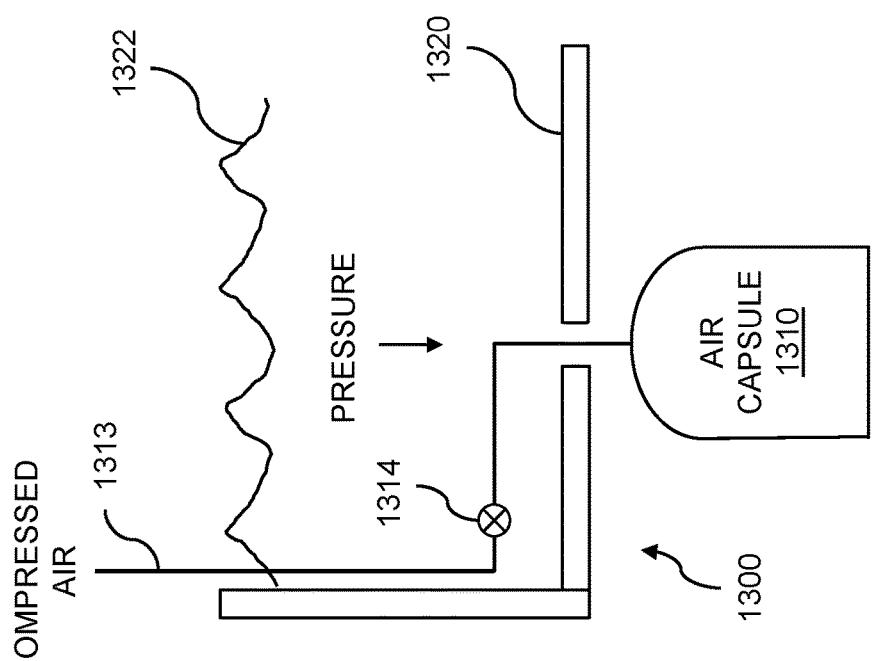

FIG. 13 illustrates underwater pressurized-air storage. A pressurized gas such as air, nitrogen, carbon-dioxide, and so on, can be used by a storage subsystem of an energy storage management system. The pressurized-air storage can support energy storage and management using pumping. Various types of storage vessels can be used to store a pressurized gas. Storage techniques such as pressurized bladders, pressurized accordion-fold bags, expandable bags or balloons, expandable containers, and so on, have been described elsewhere. Pressurized-air storage can also be accomplished using a rigid structure such as a vessel, where the vessel can be implemented using a variety of geometric shapes. An example vessel comprising an air capsule 1310 is shown for pressurized-air storage 1300. The air capsule can be located at the bottom of a body of water, where the body of water can include freshwater or saltwater. The air capsule can be located on a lakebed or seabed 1320, at the bottom of a river, and so on. The air capsule can be located beneath the lakebed or seabed. The height of the water above the air capsule can be determined by the difference between the surface 1322 of the body of water and the bed 1320. The pressure created by that water height or hydraulic head may be used to pressurize the air capsule, depending on the structure of the air capsule (e.g. rigid, flexible, expandable, etc.). The air capsule can be accessed by a feedline or pipe 1313 and a valve 1314. The pipe and value can be used by a pump or compressor to provide compressed air or another compressed gas to the air capsule.

A second structure for underwater pressurized-air storage 1302 is shown. A pump-turbine energy management system based on underwater pressurized-air storage can be implemented within a non-productive oil well infrastructure. A non-productive oil well 1330 and well head 1332 can be used as a vessel for storage of the pressurized-air or other gas. Again, a height of water above the well head can be determined by computing the distance between the surface of the body of water 1342 and the bed 1340 of the body of water. The height of water or hydraulic head can exert pressure on the well head of the oil well. The water pressure may be used to exert pressure on the oil well for pressurized-air storage. Pressurized-air or another gas can be stored in the non-productive oil well infrastructure using a feedline or pipe 1334 and valve 1336. The pressurized-air can include atmospheric air, nitrogen, carbon-dioxide, etc. The pressurized-air or other gas can be pumped into the oil well and later removed from the oil well to be used for energy recovery.

Figure 14:
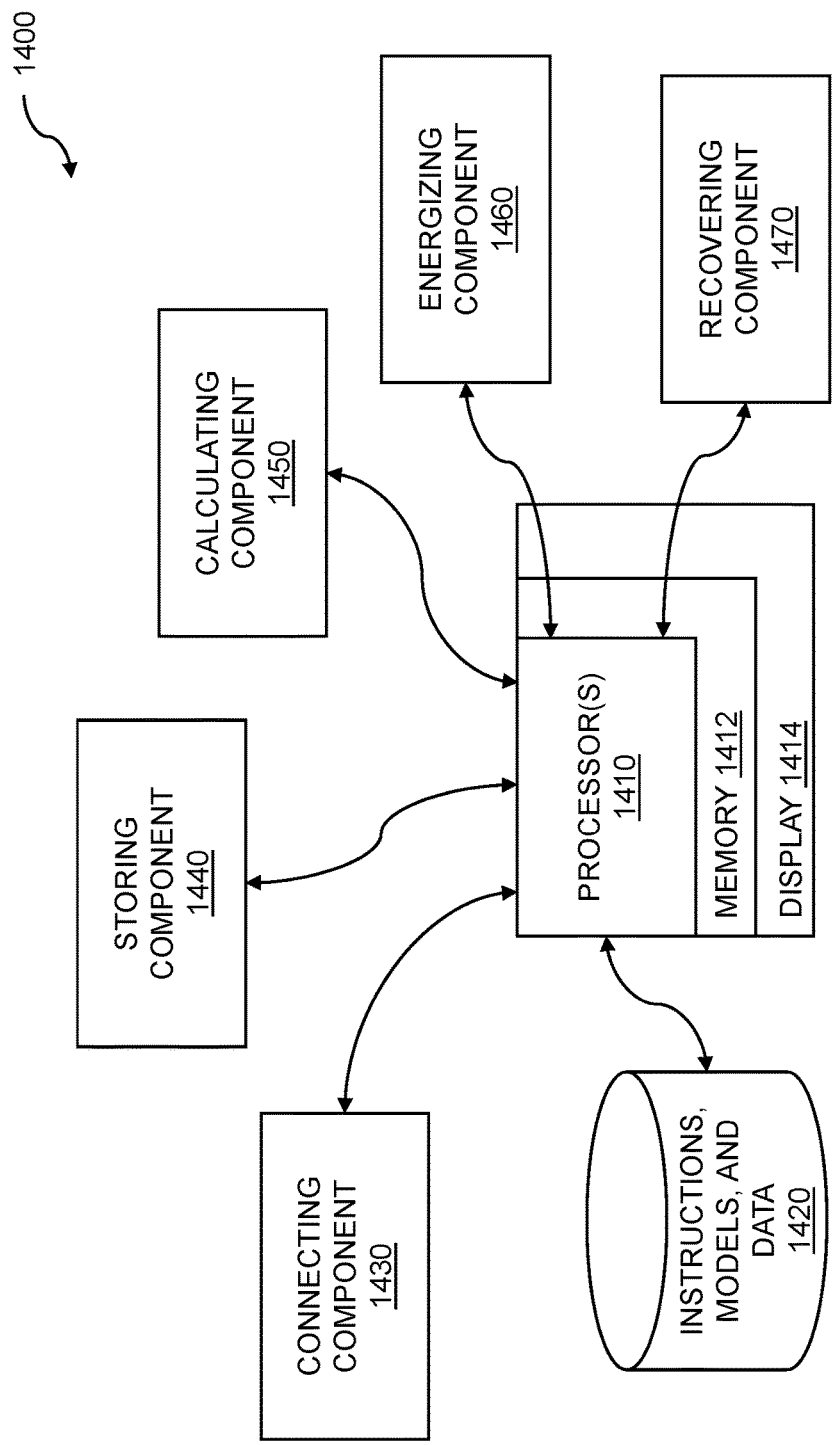
FIG. 14 is a system diagram for energy storage and management using pumping.

FIG. 14 is a system diagram for energy storage and management using pumping. An energy source is connected to a pump-turbine energy management system, wherein the pump-turbine energy management system includes a pump-energy storage subsystem. The energy management system can include various pump-energy storage subsystems, where the pump-energy storage subsystems can include high-pressure water storage, compressed air storage, and so on. The pump-energy storage subsystems can include energy module peers. An energy module peer can store various types of energy. An energy module can include compressed air, steam, liquid nitrogen, ice, and so on. Energy from the energy source is stored in the pump-energy storage subsystem. The energy that is stored can include electrical energy, potential energy, kinetic energy, hydrostatic energy, and so on. The energy storage can include storing energy for a period of time. The time period can be a short-term basis, where a short-term basis can include an integer number of seconds, minutes, or days, substantially less than a week, and so on. The time period can be a long-term basis, where a long-term basis can include an integer number of weeks, months, seasons, or years, where the integer number of weeks, months, seasons, or years, including a length of time that can be substantially more than one day. One or more processors is used to calculate a valve-based flow control setting for recovering energy from the pump-energy storage subsystem. The valve-based flow control settings can control the flow or liquid, gas, charge, etc. One or more valves in the pump-energy management system are energized, where the energizing enables energy recovery. Energy is recovered from the pump-energy storage subsystem using a pump-turbine recovery subsystem enabled by the one or more valves that were energized. The energy recovery can include using compressed air, steam, a fluid, etc., to spin a turbine. The spinning turbine can generate electrical energy.

The system 1400 can include one or more processors 1410 and a memory 1412 which stores instructions. The memory 1412 is coupled to the one or more processors 1410, wherein the one or more processors 1410 can execute instructions stored in the memory 1412. The memory 1412 can be used for storing instructions; for storing databases of energy subsystems, modules, or peers; for system support; and the like. Information regarding energy storage and management using pumping can be shown on a display 1414 connected to the one or more processors 1410. The display can comprise a television monitor, a projector, a computer monitor (including a laptop screen, a tablet screen, a netbook screen, and the like), a smartphone display, a mobile device, or another electronic display. The system 1400 includes instructions, models, and data 1420. In embodiments, the instructions, models, and data 1420 are stored in a networked database, where the networked database can be a local database, a remote database, a distributed database, and so on. The instructions, models, and data 1420 can include instructions for obtaining operating data from a plurality of energy modules, instructions for obtaining one or more operating goals for the plurality of energy modules, instructions for analyzing operating data, instructions for controlling the operation of energy modules, etc.

The system 1400 includes a connecting component 1430. The connecting component 1430 can connect an energy source to a pump-turbine energy management system, where the pump-turbine energy management system includes a pump-energy storage subsystem. The pump-energy storage subsystem can include high-pressure water storage, compressed gas storage such as air, nitrogen, or carbon-dioxide storage, and the like. The system 1400 includes a storing component 1440. The storing component 1440 can store energy from the energy source in the pump-energy storage subsystem. The energy that can be stored can include electrical energy, thermal energy, kinetic energy, mechanical energy, and so on. The storing can include transforming energy into a storable energy type such as transforming electrical energy into pressurized gas. The system 1400 includes a calculating component 1450. The calculating component 1450 can calculate, using one or more processors, a valve-based flow control setting for recovering energy from the pump-energy storage subsystem. The valve-based flow control can control the flow of liquid, gas, electrical charge, and the like. The valve-based flow control can control the flow of high-pressure water, low-pressure water, high-pressure gas, low-pressure gas, etc.

The system 1400 includes an energizing component 1460. The energizing component 1460 can energize one or more valves in the pump-energy management system, where the energizing enables energy recovery. The valves can be set to "open" or "closed", or can be adjusted for flow rate of a liquid or gas. The system 1400 includes a recovering component 1470. The recovering component 1470 can recover energy from the pump-energy storage subsystem using a pump-turbine recovery subsystem enabled by the one or more valves that were energized. Using a pump-turbine recovery subsystem can include spinning the turbine using pressurized gas such as air, nitrogen, or carbon-dioxide; using a pressurized liquid such as high-pressure water; using steam; and so on. The energy that is recovered from the pump-turbine energy management system can be provided back into the energy source. The energy source can include a utility grid, a renewable energy microgrid, and the like.

Disclosed embodiments include a computer program product embodied in a non-transitory computer readable medium for energy management, the computer program product comprising code which causes one or more processors to perform operations of: connecting an energy source to a pump-turbine energy management system, wherein the pump-turbine energy management system includes a pump-energy storage subsystem; storing energy from the energy source in the pump-energy storage subsystem; calculating a valve-based flow control setting for recovering energy from the pump-energy storage subsystem; energizing one or more valves in the pump-turbine energy management system, wherein the energizing enables energy recovery; and recovering energy from the pump-energy storage subsystem using a pump-turbine recovery subsystem enabled by the one or more valves that were energized.

Other disclosed embodiments include a computer system for energy management comprising: a memory which stores instructions; one or more processors attached to the memory wherein the one or more processors, when executing the instructions which are stored, are configured to: connect an energy source to a pump-turbine energy management system, wherein the pump-turbine energy management system includes a pump-energy storage subsystem; store energy from the energy source in the pump-energy storage subsystem; calculate a valve-based flow control setting for recovering energy from the pump-energy storage subsystem; energize one or more valves in the pump-turbine energy management system, wherein the energizing enables energy recovery; and recover energy from the pump-energy storage subsystem using a pump-turbine recovery subsystem enabled by the one or more valves that were energized.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method for energy management comprising:
    connecting an energy source to a pump-turbine energy management system, wherein the pump-turbine energy management system includes a pump-energy storage subsystem, wherein the pump-energy storage subsystem includes fluid-based compression, wherein a plurality of pumps and pressure vessels use a working fluid under pressure to compress a gas, wherein the working fluid and gas are separated by a barrier to prevent mixing and diffusion;
    storing energy from the energy source in the pump-energy storage subsystem, wherein the pump-energy storage subsystem includes compressed gas storage;
    calculating a valve-based flow control setting for recovering energy from the pump-energy storage subsystem, wherein the valve-based flow control setting controls flow of the working fluid and gas in the pump-energy storage subsystem;
    energizing one or more valves in the pump-turbine energy management system, wherein the energizing enables energy recovery; and
    recovering energy from the pump-energy storage subsystem using a pump-turbine recovery subsystem enabled by the one or more valves that were energized.

2. The method of claim 1 further comprising recovering waste heat through a waste-heat recovery subsystem.

3. The method of claim 2 wherein the waste-heat recovery subsystem includes one or more heat exchangers.

4. The method of claim 3 wherein the one or more heat exchangers enable converting water to steam.

5. The method of claim 3 wherein the one or more heat exchangers enable converting water to ice.

6. The method of claim 1 wherein the pump-turbine energy management system includes pooling of one or more of pump-energy storage subsystem components, pump-turbine recovery subsystem components, or waste-heat recovery subsystem components.

7. The method of claim 6 wherein the pooling includes redundant components.

8. The method of claim 1 wherein the pump-energy storage subsystem includes high-pressure water storage.

9. The method of claim 8 wherein the high-pressure water storage enables compressed air storage.

10. The method of claim 9 wherein enablement of the compressed air storage includes a heat exchanger.

11. The method of claim 9 wherein air from the compressed air storage is temperature controlled by latent heat of water from the high-pressure water storage.

12. The method of claim 9 wherein the compressed air storage is under a large elevation of sea water.

13. The method of claim 12 wherein the compressed air storage is maintained by an air bladder pressurized by a water column of the sea water.

14. The method of claim 9 wherein the compressed air storage is under a large elevation of water.

15. The method of claim 1 wherein the pump-turbine recovery subsystem includes a water-to-ice transition.

16. The method of claim 15 wherein the water-to-ice transition is enabled by an ice slush tank.

17. The method of claim 16 wherein the ice slush tank is driven off a heat exchanger in a water-based high compression chamber.

18. The method of claim 1 wherein the pump-turbine recovery subsystem includes a gas preheater.

19. The method of claim 18 wherein the gas preheater is connected to a heat exchanger in a water-based high compression chamber.

20. The method of claim 1 wherein the pump-turbine energy management system is implemented within a non-productive oil well infrastructure.

21. The method of claim 1 further comprising providing the energy recovered from the pump-turbine energy management system back into the energy source.

22. The method of claim 21 further comprising buffering the energy recovered from the pump-turbine energy management system using a battery storage subsystem.

23. The method of claim 1 wherein the storing further comprises transforming energy into a storable energy type.

24. The method of claim 1 wherein the pump-energy storage subsystem and the pump-turbine recovery subsystem each comprise a homogeneous bank of energy modules.

25. The method of claim 24 wherein the homogeneous bank of energy modules provides a pooled energy system.

26. A computer program product embodied in a non-transitory computer readable medium for energy management, the computer program product comprising code which causes one or more processors to perform operations of:
    connecting an energy source to a pump-turbine energy management system, wherein the pump-turbine energy management system includes a pump-energy storage subsystem, wherein the pump-energy storage subsystem includes fluid-based compression, wherein a plurality of pumps and pressure vessels use a working fluid under pressure to compress a gas, wherein the working fluid and gas are separated by a barrier to prevent mixing and diffusion;
    storing energy from the energy source in the pump-energy storage subsystem, wherein the pump-energy storage subsystem includes compressed gas storage;
    calculating a valve-based flow control setting for recovering energy from the pump-energy storage subsystem, wherein the valve-based flow control setting controls flow of the working fluid and gas in the pump-energy storage subsystem;
    energizing one or more valves in the pump-turbine energy management system, wherein the energizing enables energy recovery; and
    recovering energy from the pump-energy storage subsystem using a pump-turbine recovery subsystem enabled by the one or more valves that were energized.

27. A computer system for energy management comprising:

a memory which stores instructions;
one or more processors attached to the memory wherein the one or more processors, when executing the instructions which are stored, are configured to:
    connect an energy source to a pump-turbine energy management system, wherein the pump-turbine energy management system includes a pump-energy storage subsystem, wherein the pump-energy storage subsystem includes fluid-based compression, wherein a plurality of pumps and pressure vessels use a working fluid under pressure to compress a gas, wherein the working fluid and gas are separated by a barrier to prevent mixing and diffusion;
    store energy from the energy source in the pump-energy storage subsystem, wherein the pump-energy storage subsystem includes compressed gas storage;
    calculate a valve-based flow control setting for recovering energy from the pump-energy storage subsystem, wherein the valve-based flow control setting controls flow of the working fluid and gas in the pump-energy storage subsystem;
    energize one or more valves in the pump-turbine energy management system, wherein the energizing enables energy recovery; and
    recover energy from the pump-energy storage subsystem using a pump-turbine recovery subsystem enabled by the one or more valves that were energized.

* * * * *